United States Patent [19]

Shibata et al.

[11] Patent Number: 4,558,378
[45] Date of Patent: Dec. 10, 1985

[54] METHOD AND APPARATUS FOR A MAGNETIC RECORDING/REPRODUCING

[75] Inventors: Akira Shibata, Katsuta; Shinichi Ohashi, Chigasaki, both of Japan

[73] Assignees: Hitachi, Ltd.; Hitachi Video Engineering Inc., both of Tokyo, Japan

[21] Appl. No.: 523,855

[22] Filed: Aug. 17, 1983

[30] Foreign Application Priority Data

Aug. 27, 1982 [JP] Japan ................................. 57-147528
Sep. 3, 1982 [JP] Japan ................................. 57-152752
Sep. 17, 1982 [JP] Japan ................................. 57-161010
May 30, 1983 [JP] Japan ................................. 58-94182

[51] Int. Cl.$^4$ ......................................... H04N 5/782
[52] U.S. Cl. ................................................. 360/19.1
[58] Field of Search ....................... 360/8, 9.1, 19.1, 32, 360/33.1, 27, 28, 18, 64, 70, 71, 61

[56] References Cited

U.S. PATENT DOCUMENTS 4,303,950 12/1981 Taniguchi et al. .................. 360/19.1
4,353,098 10/1982 Heinz et al. ......................... 360/19.1
4,390,906 6/1983 Furumoto et al. .................. 360/19.1
4,473,850 9/1984 Foerster ................................ 360/9.1

Primary Examiner—Donald McElheny, Jr.
Attorney, Agent, or Firm—Antonelli, Terry & Wands

[57] ABSTRACT

A helical scan type magnetic tape recording/reproducing apparatus for recording/reproducing information, for example, a large amount of time-compressed audio PCM signals on a plurality of information tracks disposed in parallel to the direction of the tape running. Each of the time-compressed audio PCM signals are recorded with one of four frequencies of a pilot signal on a selected information track, and each of the time-compressed audio PCM signals recorded on the information tracks can be selectively reproduced from the corresponding information track. The apparatus includes a circuit for generating a plurality of track indicating pulses which respectively correspond to the information tracks and are phase-locked to the rotation of the rotating heads, and a circuit for selecting one of the track indicating pulses, which is supplied to control time compressing/expanding of an audio signal.

35 Claims, 30 Drawing Figures

FIG. 17

| Ri | Si | SW48 | SW72 | SW76 | SW56 |
|---|---|---|---|---|---|
| VIDEO SIGNAL | PCM(A) | N/A | N | N | N |
| - | PCM(B-G) | A | A | N | A |
| - | PCM(A) | N/A | N | A | A |

FIG. 18

| Ri | Si | SW48 | SW72 | SW77 | SW56 |
|---|---|---|---|---|---|
| VIDEO SIGNAL | PCM(A) | N/A | N | N | N |
| - | PCM(B-G) | A | N | A | N |
| - | PCM(A) | N/A | A | N | A |

FIG. 19

| Ri | Si | SW48 | SW78 | SW77 | SW56 |
|---|---|---|---|---|---|
| VIDEO SIGNAL | PCM(A) | N/A | N | N | N |
| - | PCM(B-G) | A | N | A | N |
| - | PCM(A) | N/A | A | N | A |

FIG. 20

| Ri | Si | SW48 | SW72 | SW78 | SW56 |
|---|---|---|---|---|---|
| VIDEO SIGNAL | PCM(A) | N/A | N | N | N |
| - | PCM(B-G) | A | A | N | A |
| - | PCM(A) | N/A | N | A | A |

METHOD AND APPARATUS FOR A MAGNETIC RECORDING/REPRODUCING

BACKGROUND OF THE INVENTION

This invention relates to a helical scan type information recording/reproducing apparatus, especially to a magnetic tape recording/reproducing apparatus for recording/reproducing a large amount of information on a magnetic tape.

Some prior art examples of a helical scan type information recording/reproducing apparatus are a consumer-use VTR (video tape recorder) represented by the VHS format, a tape pattern of which is shown in FIG. 1, and another consumer-use VTR, known as an 8 mm-Video, a tape pattern of which is shown in FIG. 2. Examples of such apparatus may be seen from the Taniguichi et al U.S. Pat. No. 4,303,950 and the Furumoto et al U.S. Pat. No. 4,390,906.

In FIG. 1 a video tape 1 is provided with a video track 2 on which a video signal is recorded, a control track 3 on which a control signal is recorded, and an audio track 4 on which an audio signal is recorded. The tracing direction of a rotating head is indicated by the arrow 5 and the running direction of the video tape 1 is indicated by the arrow 6. The portions $\theta_1$, $\theta_2$ and $\theta_3$, respectively, of the video track denote winding angles of the video tape wound around a rotating cylinder. The angles $\theta_1$ and $\theta_3$ are nearly equal to 5° and the angle $\theta_2$ is nearly equal to 180°. The angle $\theta_2$ corresponds to the duration of recording of the video signal, and the angles $\theta_1$ and $\theta_3$ correspond to the duration of the margin for maintaining an excahangeability of the two rotating heads.

In FIG. 2 video may be recorded on the track segment 2, while a track segment 7 is utilized for recording a time-compressed audio signal. The numeral 8 designates a first option track, and the numeral 9 designates a second option track. The time-compressed audio signal is produced by converting an audio signal to a PCM signal and compressing the PCM signal to about one-sixth time scale. The portions $\theta_1$, $\theta_2$, $\theta_3$ and $\theta_4$, respectively, of the video track denote winding angles of the video tape as it is wound around a rotating cylinder. The angles $\theta_1$ and $\theta_3$ are nearly equal to 5°. The angle $\theta_2$ is nearly equal to 180°, and the angle $\theta_4$ is nearly equal to 30°. The angle $\theta_4$ responds to the duration of recording of the time-compressed audio signal.

As can be seen from the above explanation of the prior art, there are only one or two kinds of information which can be recorded on one slant track with the prior art apparatus. Accordngly, the utilization range of the video tape with the prior art apparatus is very narrow.

SUMMARY OF THE INVENTION

It is an object of the present invention to provide a helical scan type magnetic recording/reproducing method and apparatus, which is able to record/reproduce a large amount of information on one slant track in order to enlarge the utilization range of the tape.

Firstly, in accordance with the present invention, each slant track is divided into a plurality of N segments in the head scanning direction. That is, the tape is divided into a plurality of N information tracks which are disposed in parallel to the direction of the tape running. Each of a number of different information items may be independently recorded on each of the N information tracks, or the different information items may be sequentially recoreded on the N information tracks along each slant track. One of the different information items can be recorded on the information track as voluntarily selected by the operator. Also, the information item can be reproduced from an information track voluntarily selected by the operator.

The present invention provides a helical scan type magnetic recording/reproducing apparatus including means for selecting one of the N information tracks during the recording mode and the reproducing mode. The selecting means comprises a pulse generator for generating a number of track indicating pulses which are phase locked to the rotation of the rotating heads and a data selector connected to the pulse generator for selecting one of the track indicating pulses. The selected track indicating pulse is supplied to an information recordong/reproducing processor in order to determine the recording/reproducing timing of the information.

BRIEF DESCRIPTION OF THE DRAWINGS

FIG. 7A is a schematic diagram of the digital processor which forms part of the audio signal recording processor shown in FIG. 7;

FIG. 7B is a schematic diagram of the pulse delay circuit which forms part of the audio signal recording processor shown in FIG. 7;

FIGS. 17, 18, 19 and 20, respectively, are tables for indicating the states of four switches shown in FIGS. 12, 13, 14 and 15;

DETAILED DESCRIPTION OF THE PREFERRED EMBODIMENT

Figure 3:
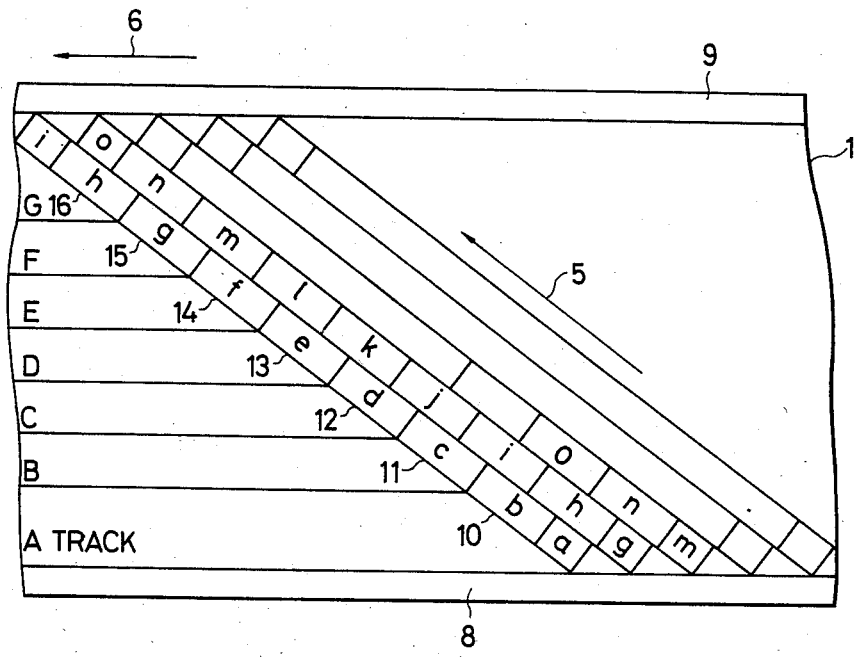
FIG. 3 is a schematic diagram of an embodiment of a tape pattern of the present invention.

FIG. 3 shows an example of a tape pattern recorded by the present invention, which is applied to the video tape recorder of the 8 mm Video tape. In FIG. 3 each slant track is divided into seven segments 10–16 to provide seven information tracks (or channels) A–G. That is, the number N described above is equal to 7. In the tape pattern of FIG. 3, the tape is wound around 220° of the rotating cylinder. The information tracks A and G are respectively wound around 35° thereof, and the information tracks B. C, D, E and F are respectively wound around 30° thereof.

Figure 4:
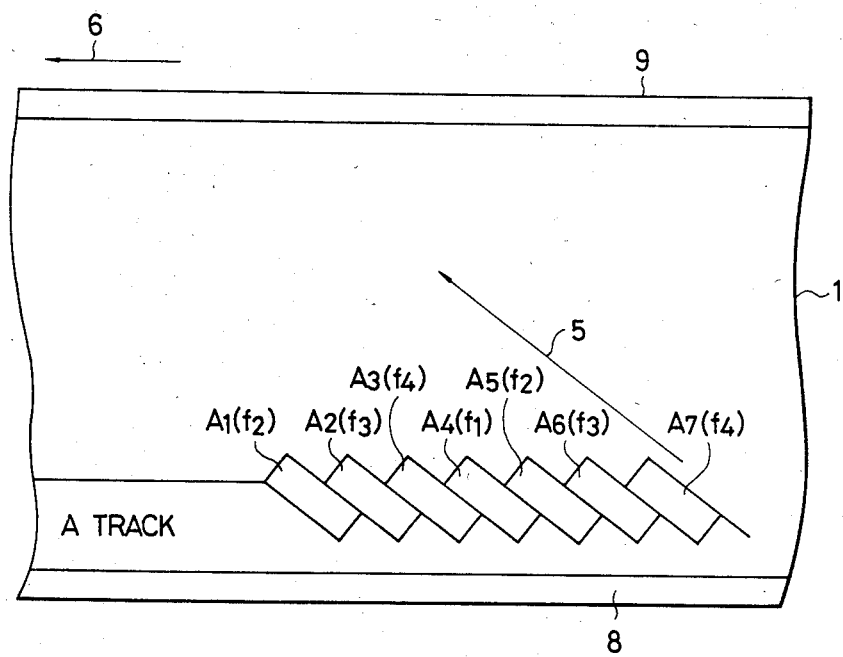
FIG. 4 is a schematic diagram of another embodiment of a tape pattern of the present invention.

FIG. 4 shows a specific example of the tape pattern shown in FIG. 3; however, in this example, only one time-compressed audio PCM signal is recorded on the information track A selected from the information tracks A–G, and the recorded signal contains a plurality of track segments ($A_1 \ldots A_7 \ldots$). The apparatus of the present invention shown in FIG. 5 is explained hereinafter, with reference to the tape patterns shown in FIGS. 3 and 4.

Figure 5:
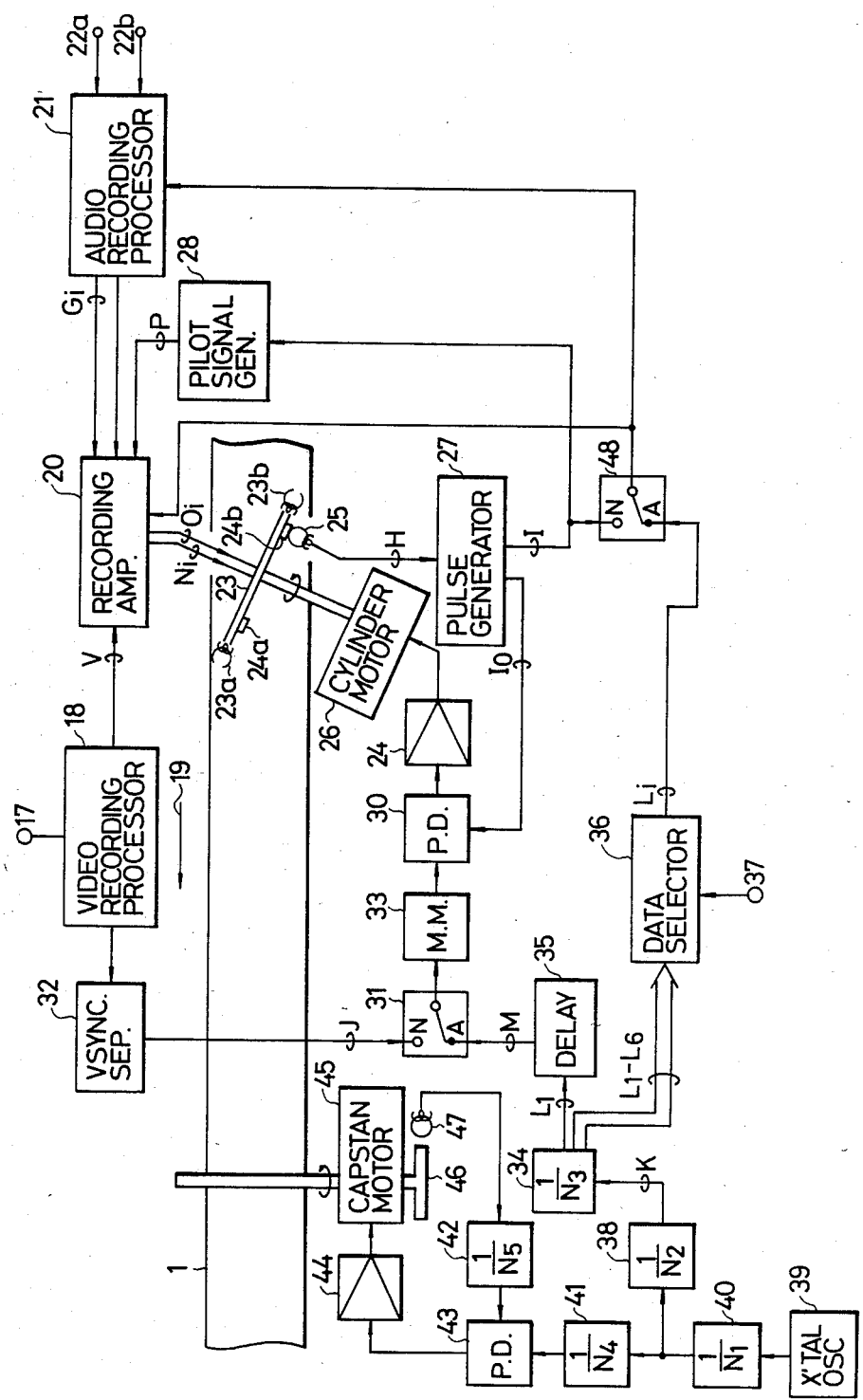
FIG. 5 is a block diagram of an embodiment of a magnetic recording apparatus of the present invention.

In FIG. 5, the numerals 22a and 22b denote input terminals from which a 2-channel (stereo) audio signal is applied to an audio signal recording processor 21. The audio signal recording processor 21 converts the audio signal into a PCM signal and compresses the audio PCM signal on the time scale. The compressed audio PCM signal is supplied to a recording amplifier circuit 20, in which the compressed audio PCM signal is mixed with a pilot signal P from a pilot signal generator 28. The output signals Ni or Oi of the recording amplifier circuit 20 are respectively supplied to the rotating heads 23a and 23b of the recording apparatus. The recording amplifying circuit 20 will be explained later in detail with reference to FIG. 8. The rotating heads 23a and 23b are attached to the rotating cylinder 23 which is driven by the cylinder motor 26.

Figure 6:
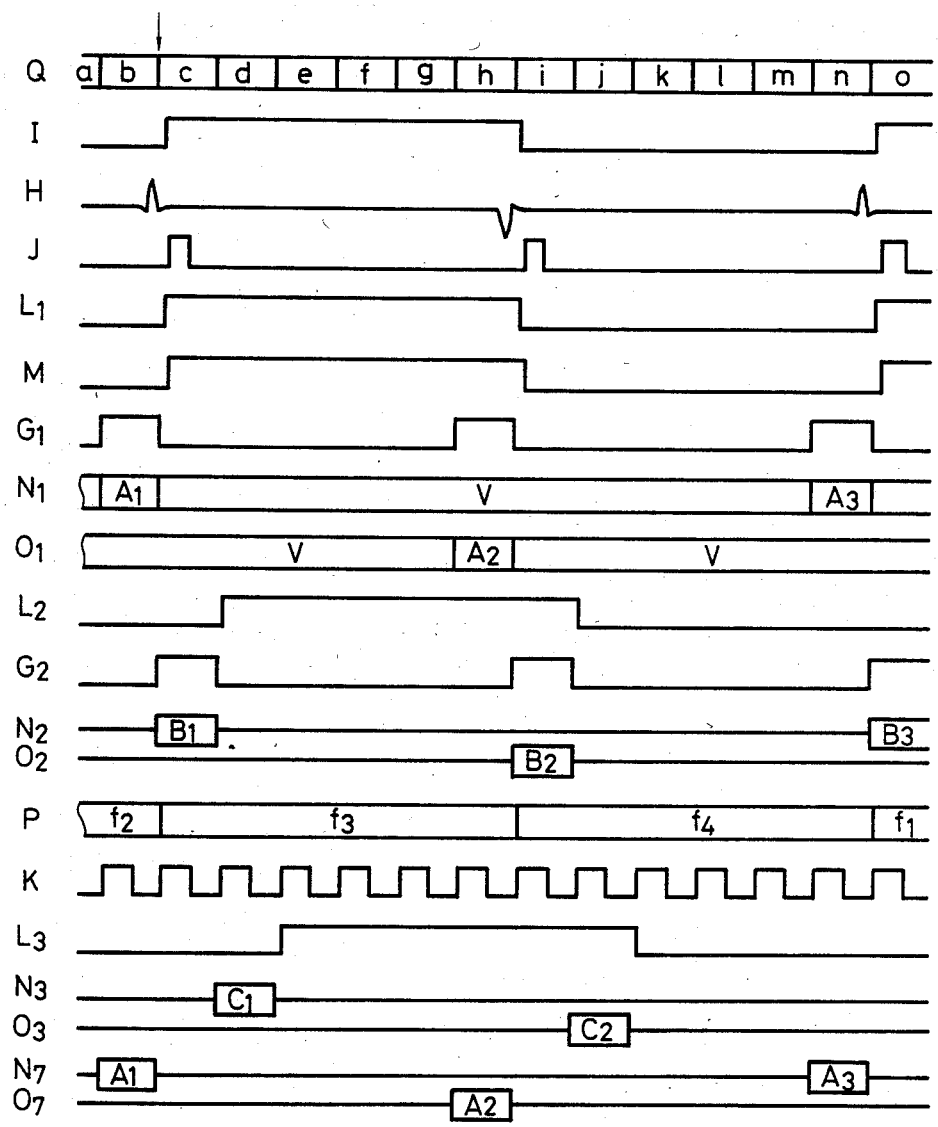
FIG. 6 is a schematic diagram of waveforms of the parts shown in FIG. 5.

The numerals 24a and 24b denote two magnets attached to the rotating cylinder 23 at diametrically-opposite points, and the numeral 25 designates a pick-up head. The pick-up head 25 produces a series of pulses H, as shown in FIG. 6. In FIG. 5, the magnet 24a, which is positioned a small distance ahead of the rotating head 23a in the rotating direction, produces a series of positive going pulses, and the magnet 24b, which is positioned a small distance ahead of the rotating head 23b in the rotating direction, produces a series of negative going pulses. The pulses H from the pick-up head 25 are shaped by a pulse generator 27, which may be provided in the form of a delay circuit, a wave-shaping circuit, etc., and produces output pulses I and Io. The signal level of the output pulse I is related to the rotating phase or position of the heads 23a and 23b. In FIG. 5, when the head 23a is tracing on the information tracks B–G, the level of the output pulse I is high, and when the head 23b is tracking on the information track B–G, the level of the output pulse I is low.

The output pulse I is supplied from the pulse generator 27 to the pilot signal generator 28. The pilot signal generator 28 sequentially generates a pilot signal P having frequencies of $f_1$, $f_2$, $f_3$ or $f_4$ in response to the level of the output pulse I. In case the level of the output pulse I is high, the frequency of the pilot signal P is $f_1$ or $f_3$; and, on the other hand, when the level of the output pulse I is low, the frequency of the pilot signal P is $f_2$ or $f_4$, as seen in FIG. 6, for example. Thus, the information tracks B–G for each slant track will be modulated at a different pilot frequency, as will be explained hereinafter. Responding to each change of the high and low levels, the pilot signal generator 28 varies the frequencies of the pilot signal P as indicated below.

$$f_1 \rightarrow f_2 \rightarrow f_3 \rightarrow f_4 \rightarrow f_1 \rightarrow f_2 \ldots$$

For example, the frequencies of the pilot signal P may be selected as follows:

$f_1 = 6.5$ fH,
$f_2 = 7.5$ fH
$f_3 = 10.5$ fH,
$f_4 = 9.5$ fH (fH: the horizontal synchronous frequency)

Next, a method for synchronizing the phase of the cylinder motor 26, that is, the rotation of the rotating heads 23a and 23b, with the positions of the information tracks is explained. The numeral 30 designates a phase detector that compares the output pulse Io from the pulse generator 27 with an output signal from a monostable multivibrator 33. The output pulse Io, which is not shown in FIG. 6, has the same frequency as the output pulse I, but has a different phase from that of the output pulse I. A switch denoted by the numeral 31 is connected to the input terminal of the monostable multivibrator 33. The switch 31 selects either a vertical sync pulse J from a vertical sync pulse separator 32 or a pulse signal M from a delay circuit 35. For example, when the apparatus records the compressed audio PCM signal on the information track A, as shown in FIG. 4, the switch 31 selects the pulse signal M, which is derived from an output pulse of a timing oscillator 39 via dividers 40, 38 and 34.

In response to the input pulse K, the divider 35 produces parallel output pulses $L_1$–$L_6$, certain ones of which are shown in FIG. 6. The parallel output pulses $L_1$–$L_6$ are used for track indicating pulses. Also, the output pulse $L_1$ is delayed by the delay circuit 35 and becomes the pulse signal M. The turning of the pulse signal M is compared with the output pulse Io in the phase detector 30. The monostable multivibrator 33 is provided to convert the vertical sync pulse J, which is 60 Hz, to a frame of 30 Hz. However, the monostable multivibrator 33 has no influence on the pulse signal M, which is already 30 Hz. The output signal of the phase detector 30 is amplified by an amplifier 29 and controls the rotating phase of the cylinder motor 26. As a result, the rotation of the rotating heads 23a and 23b is phase locked to the track indicating pulses $L_1$–$L_6$.

The track indicating pulses $L_1$–$L_6$ are also supplied to a data selector 36, which has an input terminal 37 for receiving a track select signal. One of the track indicating pulses $L_1$–$L_6$ selected by the data selector 36 is supplied to the control terminal of the audio signal recording processor 21 via a switch 48. When the compressed audio PCM signal is to be recorded on the information track A, the data selector 36 selects the track indicating pulse $L_1$ in response to the track select signal applied to terminal 37.

The numeral 45 denotes a capstan motor. In order to maintain the speed of the tape 1 constant, a phase detector 43 is used to control the speed of the capstan motor 45. One of the input signals to the phase detector 43 comes from the crystal oscillator 39. In this regard, the output pulses of the divider 40 is further divided by a divider 41 and supplied to the phase detector 43. A frequency generator 46, which is attached to the capstan motor 45, and a pick-up head 47 form a generator for a pulse signal, which is applied to a divider 42. The output pulse of the divider 42 is supplied to a phase detector 43. A phase error signal from the phase detector 43 is amplified by a motor driving amplifier 44 and drives the capstan motor 45.

Figure 1:
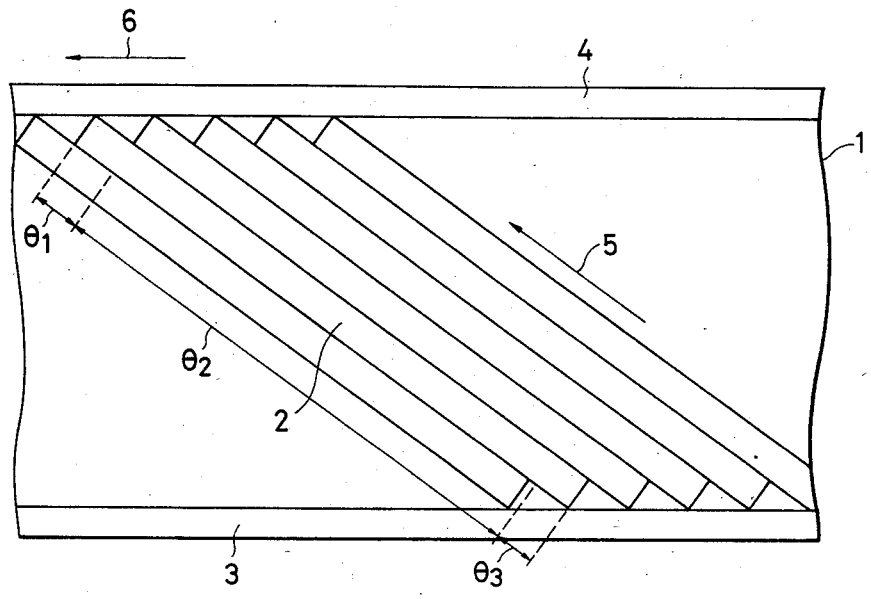
FIG. 1 is a schematic diagram of a tape pattern of the type used in the prior art.
Figure 2:
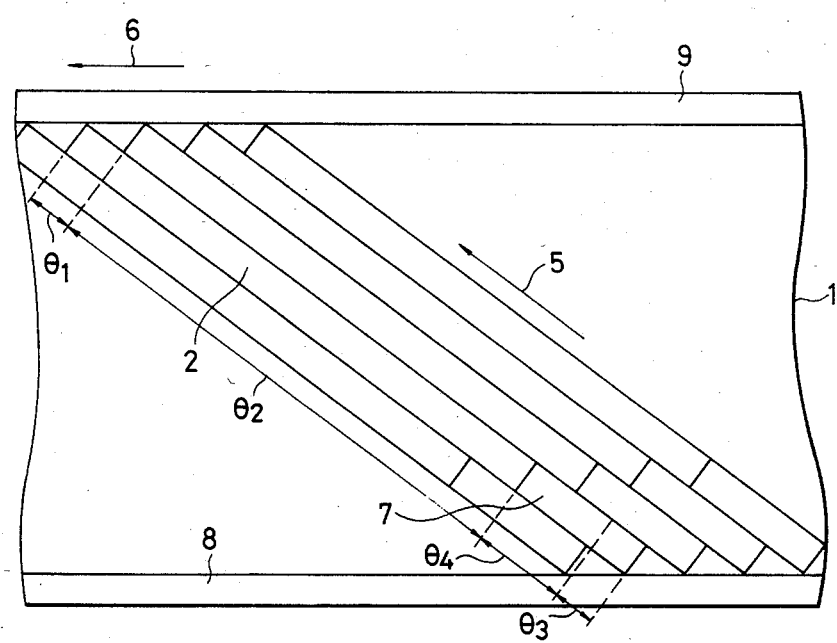
FIG. 2 is a schematic diagram of another tape pattern of the type used in the prior art.

The terminals (N) of the switches 31 and 48 are used in the apparatus to record the tape pattern shown in FIG. 2. The switches 31 and 48 are controlled by a manual labor. The numeral 18 denotes a video signal recording processor, and the numeral 17 denotes an input terminal which receives the video signal. The video signal recording processor 18 converts the chrominance signal of the video signal into a low frequency range signal and the luminance signal into an FM signal. In the case where the video signal and the compressed audio PCM signal are recorded as shown in FIG. 2, the vertical synchronous pulse J is supplied to the monostable multivibrator 33 via the switch 31. The monostable multivibrator 33 produces the frame pulse, which is compared with the output pulse Io in the phase detector 30. In this case, the audio is compressed and recorded on the information track A.

Referring to FIG. 6, Q designates a time axis. As the time varies from period (a) to period (g), the head 23a traces the information tracks A–F, as shown in FIG. 3. In the middle of the period (g), the head 23b begins to trace the information track A. Both of the heads 23a and 23b track simultaneously on the tape during at least part of the periods (g), (h) and (i). In the same manner, both of them trace on the tape during at least part of the periods (a), (b) and (c), and (m), (n) and (o). When the head 23a is tracing on the information track A, the head 23b traces on the information tracks F and G. This is due to the fact that the tape is wound on the cylinder for more than 180°, as already described.

It is desirable that the pilot signal generator 28 is simple, so that when both of the heads 23a and 23b simultaneously record, the frequency of the pilot signal does not vary.

Next, the timing for compressing the audio PCM signal will be explained. In FIG. 4, the time-compressed audio PCM signal recorded on the track segment $A_1$ is obtained from the audio signal during periods up to and including the period (a) and is modulated by PCM and compressed in the audio signal recording processor 21. Similarly, the signal recorded on the track segment $A_2$ corresponds to the audio signal during the periods (b)–(g), and the signal recorded on the track segment $A_3$ corresponds to the audio signal during the periods (h)–(m).

Figure 7:
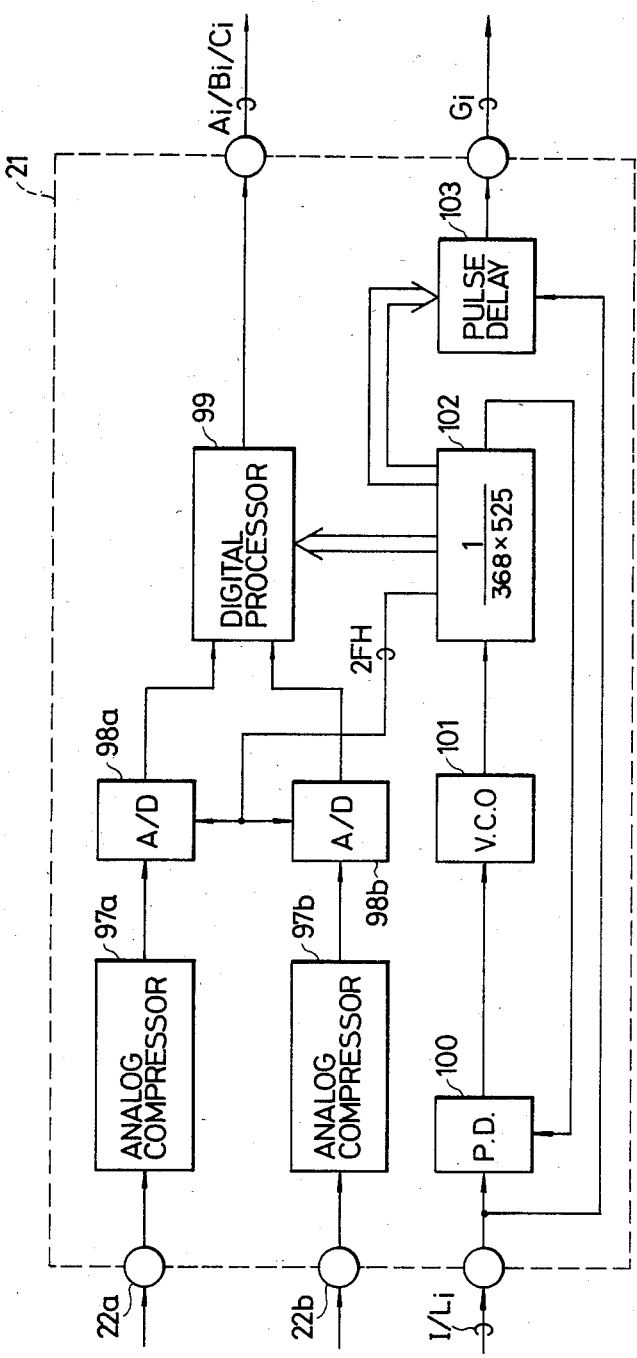
FIG. 7 is a block diagram of an embodiment of an audio signal recording processor shown in FIG. 5.

FIG. 7 shows an embodiment of the audio signal recording processor 21 shown in FIG. 5. In FIG. 7, the numerals 97a and 97b denote analog compressors, the numerals 98a and 98b denote analog-digital converters, and the numeral 99 denotes a digital signal processor which operates to perform time compressing, error compensation and other operations on the received digital signals. The numerals 100, 101 and 102 respectively denote a phase detector, a voltage controlled oscillator and a divider, which elements form a phase locked loop. The numeral 103 denotes a pulse delay circuit using the output pulses from the divider 102 to convert the pulse I or the track indicating pulse Li having the frame frequency into a gate pulse Gi, shown in FIG. 6. The gate pulse Gi is used in the recording amplifying circuit 20.

The divider 102 shown in FIG. 7 generates several trains of pulses having the the frequencies 2 Fh, 16 Fh, 184 Fh, and 368 Fh. The A/D converters 98a and 98b shown in FIG. 7 receive the pulse having the frequency 16 Fh and convert the analog signals from the analog compressors 97a and 97b to digital signals of 8 bits. As seen in FIG. 7A, the digital processor 21 has random access memories (RAMs 1, 2, 3 and 4) 99A–99D for time-compressing the digital signals at 1/23 compressing rate. That is, during the high level period of the pulse Li shown in FIG. 6, the RAMs 1 and 3 write the digital signals by using the clock pulse having the frequency 16 Fh, and the RAMs 2 and 4 read the digital signals by using the clock pulse having the frequency 368 Fh. On the other hand, during the low level period of the pulse Li shown in FIG. 6, the RAMs 1 and 3 read the digital signals by using the clock pulse having the frequency 368 Fh, and the RAMs 2 and 4 write the digital signals by using the clock pulse having the frequency 16 Fh. The numerals 99E and 99F designate modulating circuits in which the time compressed digital signals are converted to new digital signals which are easy to record on the magnetic tape, that is, "1" level signals are converted to pulses having the frequency 368 Fh and "0" level signals are converted to pulses having the frequency 184 Fh. The numeral 99G denotes a matrix circuit in which two converted digital signals from the modulating circuits 99E and 99F, and an error compensation signal (an error correction signal), generates the output signal Ai/Bi/Ci.

The pulse delay circuit 103 shown in FIG. 7 is made up of a ½ divider 103a and a pulse count type monostable multivibrator 103b, as seen in FIG. 7B. The monostable multivibrator 103b produces an output having the delay time 215 Fh to the pulse I or Li and a pulse width 44 Fh.

Returning to FIGS. 5 and 6, the frequency of the timing pulse K is explained hereinafter. In the tape pattern shown in FIG. 3, the slant track corresponding to 180° of the wound angle is divided into six track segments B–F and a part of segment G, i.e., involve periods (c) through (h). The 180° of the wound angle correspond to the pulse width of the output pulse I shown in FIG. 6. Accordingly, for the timing pulse K, it is necessary to use a pulse which is phase-locked to the output pulse I and has twelve times the frequency thereof. In the 8 mm Video type of NTSC format, the frequency of the cylinder motor 26 is about 30 Hz. So, in the case where the frequency of the crystal oscillator 39 is 3.58 MHz, to obtain a frequency of 30 Hz, $$N_1 \times N_2 \times N_3 \approx 119{,}448$$

The output signal M from the delay circuit 35 is synchronized in phase to the output pulse Io. So, by setting the dividing ratio $N_3 = 12$, the timing pulse K is obtained.

The divider 34 divides the timing pulse K to one twelfth, and produces the parallel output pulses $L_1$–$L_6$ having six different phases; that is, 0 degree, 30 degrees, 60 degrees, 90 degrees, 120 degrees, and 150 degrees. As described before, the data selector 36 selects one of the parallel output pulses $L_1$–$L_6$ as the track indicating pulse, for example, the pulse $L_1$ in the case where the signal is recorded on the information track A, and the pulse $L_2$ in case that the signal is recorded on the information track B.

The dividing ratios $N_1$ and $N_2$ of the dividers 38 and 40 are explained. As $N_3$ equals 12, $$N_1 \times N_2 \approx 9954$$

By reason of simplifying the servo system of the capstan motor 45, $$N_4 = N_5 = 1$$

In this case, if $N_2$ equals 1, the output frequency of the divider 41 becomes about 360 Hz, and $N_1$ equals about 9954.

Figure 8:
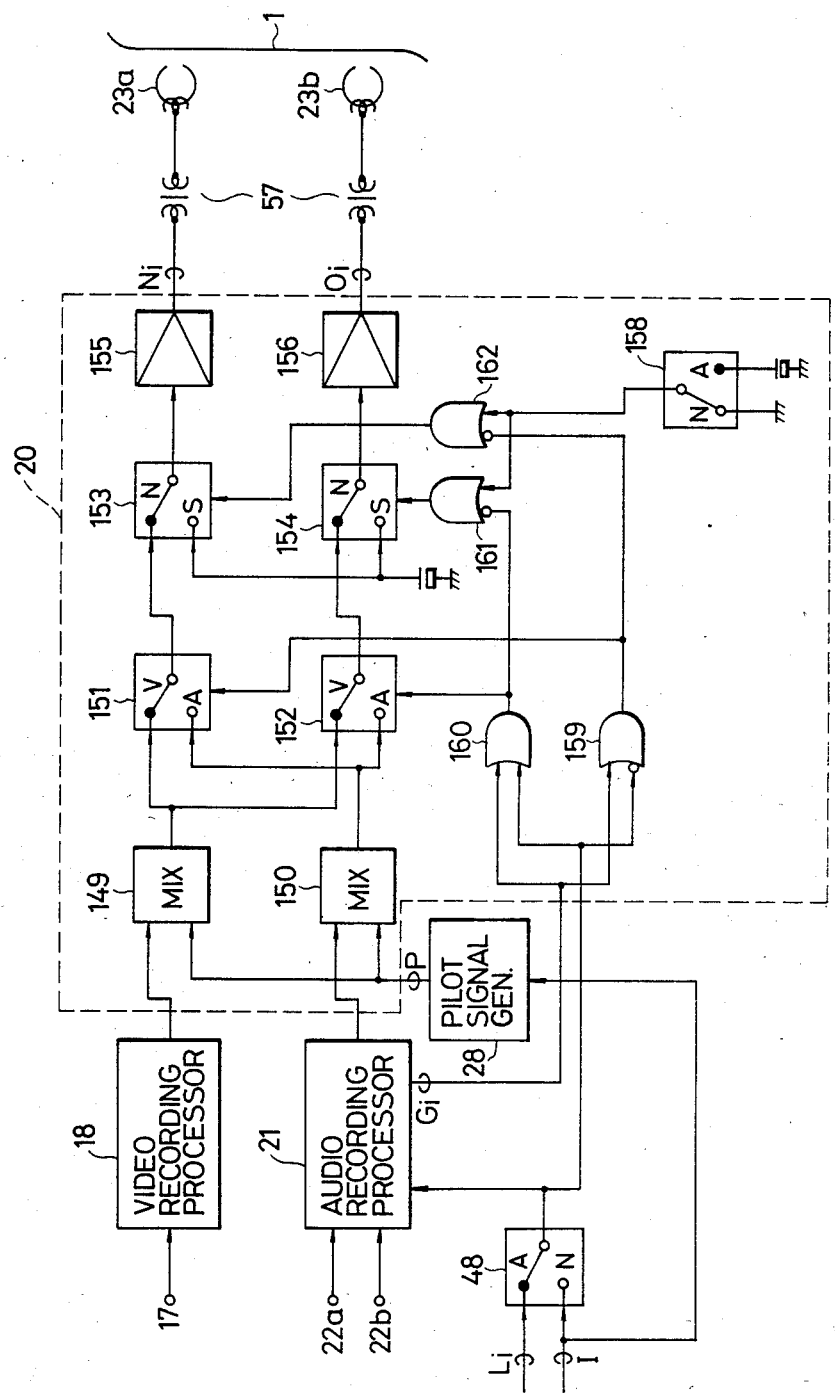
FIG. 8 is a block diagram of an embodiment of a recording amplifying circuit shown in FIG. 5.

FIG. 8 shows an embodiment of the recording amplifying circuit 20 shown in FIG. 5. In FIG. 8 the numeral 149 denotes a mixing circuit for the video signal and the pilot signal and the numeral 150 denotes a mixing circuit for the compressed audio PCM signal and the pilot signal. The numerals 151 and 152 designate switches for switching the signals, and the numerals 153 and 154 denote switches for squelching. When the levels of the control signals applied to the switches 151, 152, 153 and 154 are low, the terminals V and N thereof are selected. On the other hand, when they are high, the terminals A and S thereof are selected. The numerals 155 and 156 denote driving amplifiers and the numeral 157 designates 2-channel rotary-transformers. The numerals 159, 160, 161 and 162 denotes AND CIRCUITS.

As already indicated, the time for recording the compressed audio PCM signal is determined by the signal Gi from the audio recording processor 21, and the signal Gi along with the pulse I, Li (depending on switch 48) control the gates 159–162 to operate the switches 151–154 to selectively supply the video and compressed audio signals to the heads 23a and 23b with the proper timing.

Figure 9:
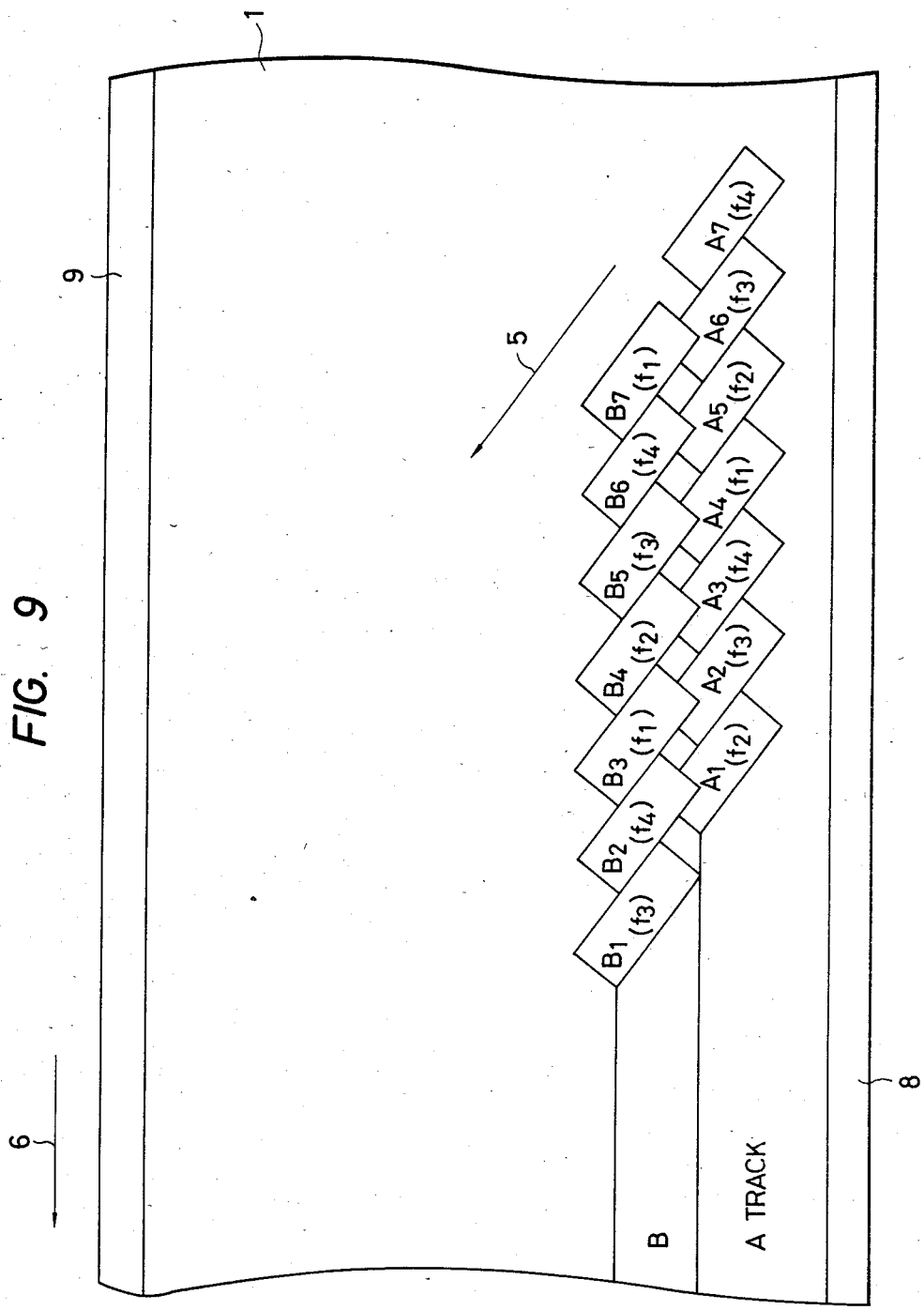
FIG. 9 is a schematic diagram of a third embodiment of the tape pattern of this invention.

Next, the recording of the tape pattern shown in FIG. 9 is explained. FIG. 9 shows a tape pattern wherein another audio signal is recorded on the information track B of the tape after another audio signal has been already recorded on the information track A. This may occur when the tape is run in one direction to record the track A, and then is run in the opposite direction to record the track B, for example. On the other hand, after recording the track A by running the tape in the direction 6, for example, the tape may be rewound and run in the direction 6 again to record the track B, or vice versa.

When the signal is recorded on the information track B, the data selector 36 shown in FIG. 5 selects the track indicating pulse $L_2$. Accordingly, the audio signal corresponding to the periods up to and including the period (b) is recorded on the track segment $B_1$, the audio signal corresponding to the periods (c)–(h) is recorded on the track segment $B_2$, and the audio signal corresponding to the periods (i)–(n) is recorded on the track segment $B_3$ and so forth. The pilot signal recorded on the track segment $B_1$ has the frequency $f_1$ or $f_3$, and in FIG. 6 it is shown as $f_1$. So, the pilot signals of the frequency $f_3$, $f_4$, $f_1$, $f_2$, $f_3$, $f_4$ and $f_1$ are respectively recorded on the track segments $B_1$, $B_2$, $B_3$, $B_4$, $B_5$, $B_6$ and $B_7$.

Referring to FIG. 9, there is the difference of about half pitch between the center of the track segment A, and the center of the track segment $B_1$. As both of the information tracks A and B are not simultaneously recorded, the relative position of the track segments $A_1$ and $B_1$ cannot be controlled exactly. However, as there is little possibility that the signals will be simultaneously reproduced from the information tracks A and B shown in FIG. 9, the difference in position between the track segment $A_1$ and the track segment $B_1$ will cause no problem in the reproduction of the recorded information. Namely, in the case of reproducing only the information track A, it is necessary to detect the pilot signal when the heads 23a and 23b track the information track A. Accordingly, the pilot signal recorded on the information tracks, except for the information track A, does not disturb the tracking servo system. A magnetic reproducing apparatus of this invention will be explained later in detail by reference to FIGS. 12 through 22.

Figure 10:
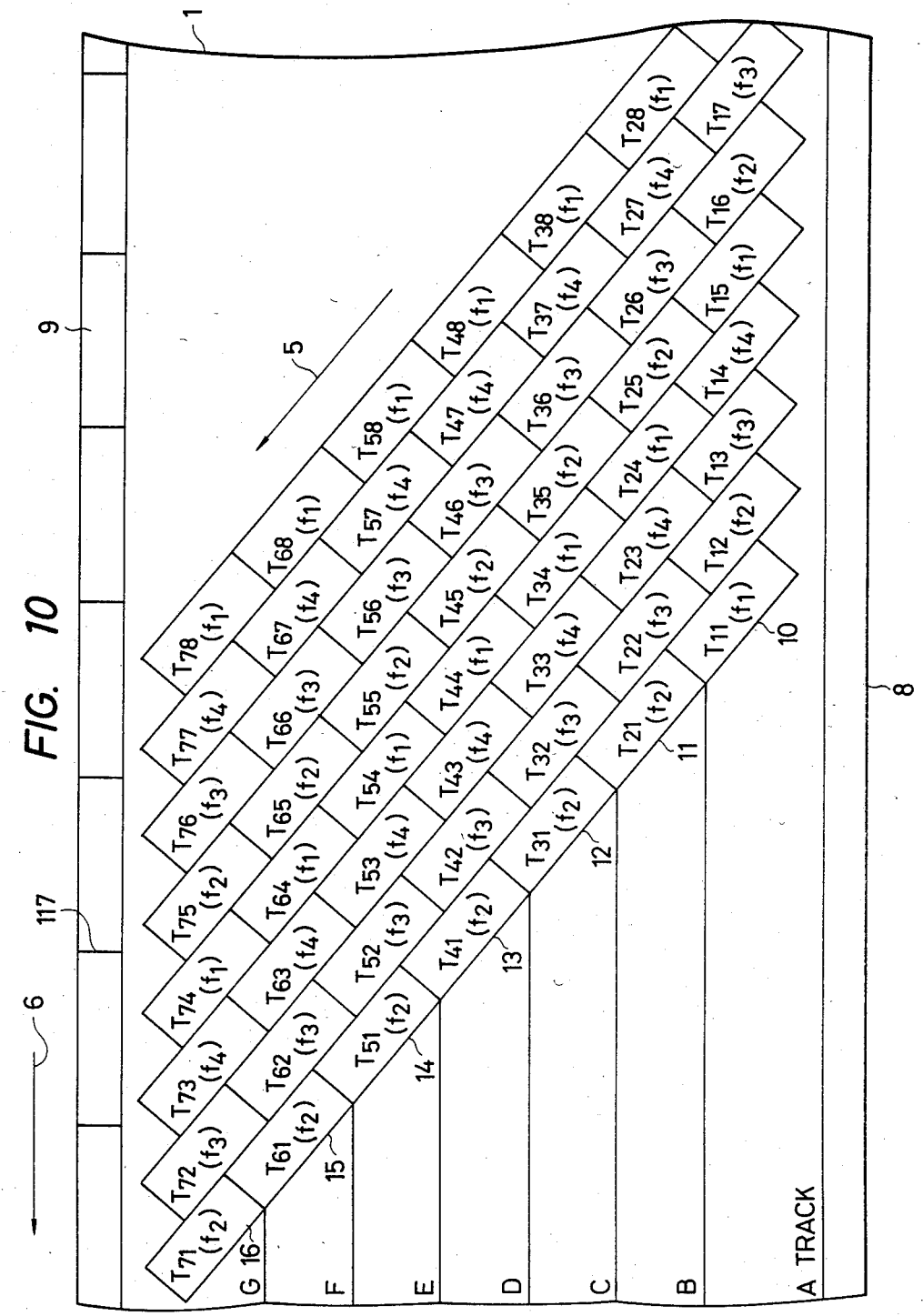
FIG. 10 is a schematic diagram of a fourth embodiment of the tape pattern of the present invention.

FIG. 10 shows another specific example of the tape pattern shown in FIG. 3. In FIG. 10, seven time-compressed audio PCM signals $T_1$–$T_7$ are respectively recorded on the information tracks A–G. All segments $T_{11}$, $T_{12}$, $T_{13}$ . . . of the time-compressed audio PCM signal $T_1$ is recorded on the information track A. Seven segments on each slanting track, for example, $T_{11}$, $T_{21}$, $T_{31}$, $T_{41}$, $T_{51}$, $T_{61}$ and $T_{71}$, are recorded in sequence. Accordingly, the same pilot signal $f_2$ is recorded on the seven segments $T_{21}$, $T_{31}$, $T_{41}$, $T_{51}$, $T_{61}$, $T_{71}$ and $T_{12}$. The numeral 117 denotes the tracking pulse recorded on the second option track 9, which tracking pulse is used for the tracking servo similarly to the pilot signal. The reason for this is that one type of reproducing apparatus can only reproduce the tracking pulse for the tracking servo and another type of reproducing apparatus can only reproduce the pilot signal.

Figure 11:
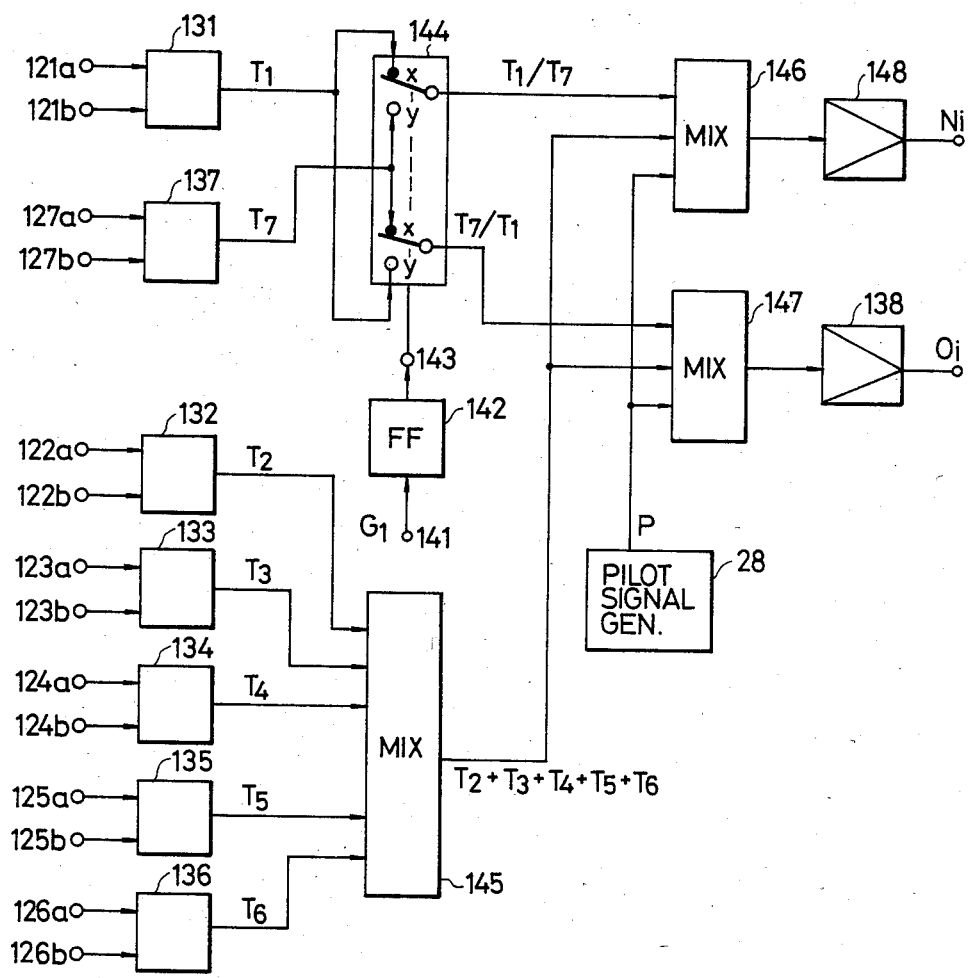
FIG. 11 is a block diagram of an embodiment of the essential part of the apparatus for recording the tape pattern shown in FIG. 10.

FIG. 11 is a block diagram of an essential part of the apparatus for recording the tape pattern shown in FIG. 10. The block diagram corresponds to the audio processor 21 and the recording amplifying circuit 20 shown in FIG. 5. The numerals 121a and 121b and 127a and 127b denote the input terminals for seven stereo audio signals. The numerals 131–137 designate audio processors producing the time-compressed audio PCM signals. The numeral 144 denotes a switch-group which has a control terminal 143. A control pulse supplied to the control terminal 143 is generated by a flip-flop 142, having an input terminal 141 for receiving a pulse, for example, the gate pulse $G_1$ shown in FIG. 6. The numerals 145, 146 and 147 denote mixers.

The control pulse generated from the flip-flop 142 has the same form as the pulse $L_1$ shown in FIG. 6. In addition, the audio processors 131–137 are each provided with an information track selecting signal Li which provides for a time separation of the output signals $T_1$–$T_7$, i.e., each of the time-compressed audio PCM signals $T_1$–$T_7$ is produced in a respective one of the tracks A–G. Thus, the signals $T_2$–$T_6$ can be applied through the mixer 145 to the respective mixers 146 and 147 without interference. At the same time, the switch group 144 changes the state X or Y at the rate of 60 Hz. The mixers 146 and 147 mix the time-compressed audio PCM signals $T_1$–$T_7$ and the pilot signal. The output signals of the mixers 146 and 147 are respectively amplified by the recording amplifiers 148 and 138 and are supplied to the heads 23a and 23b.

Figure 12:
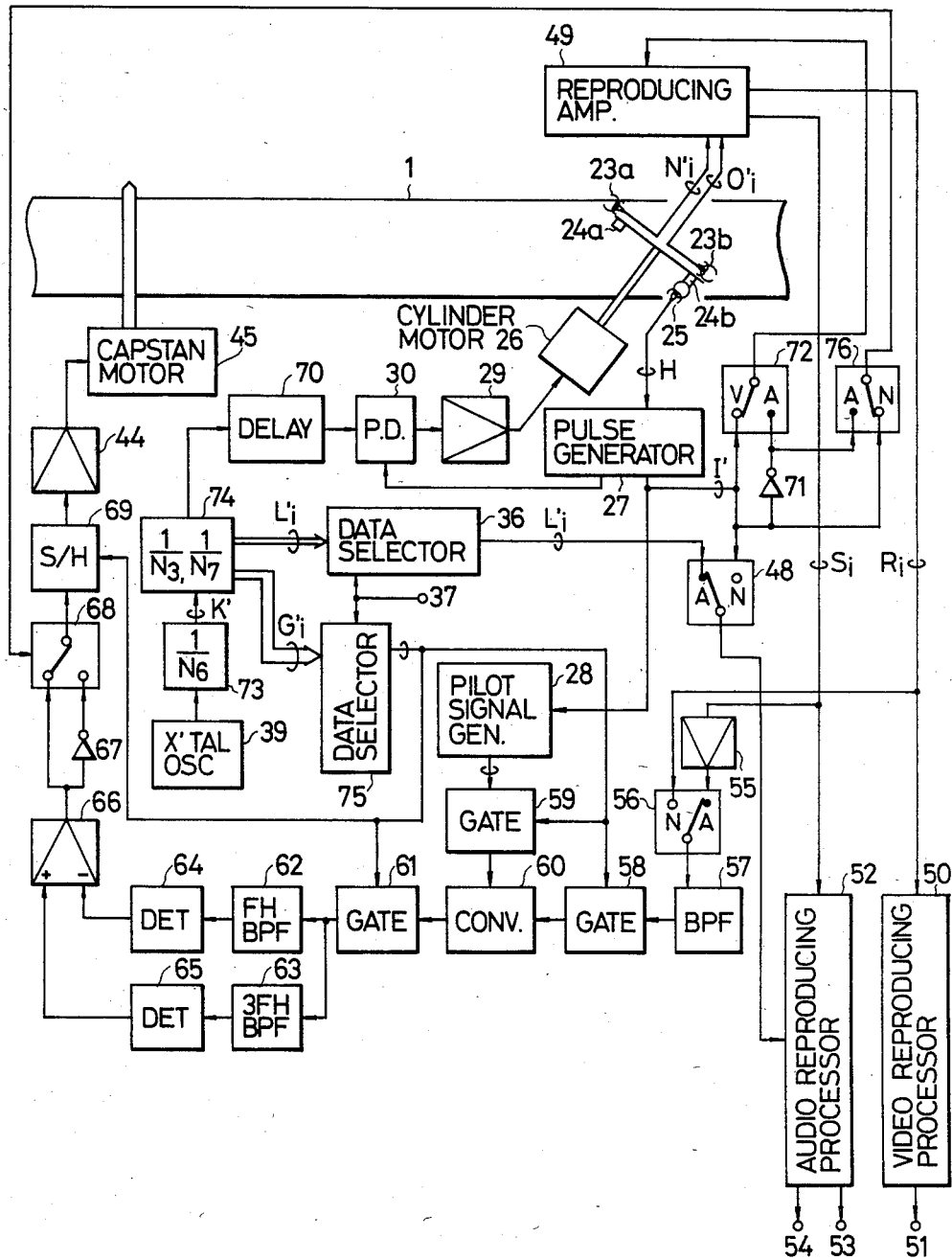
FIG. 12 is a block diagram of an embodiment of a magnetic reproducing apparatus of the present invention.
Figure 13:
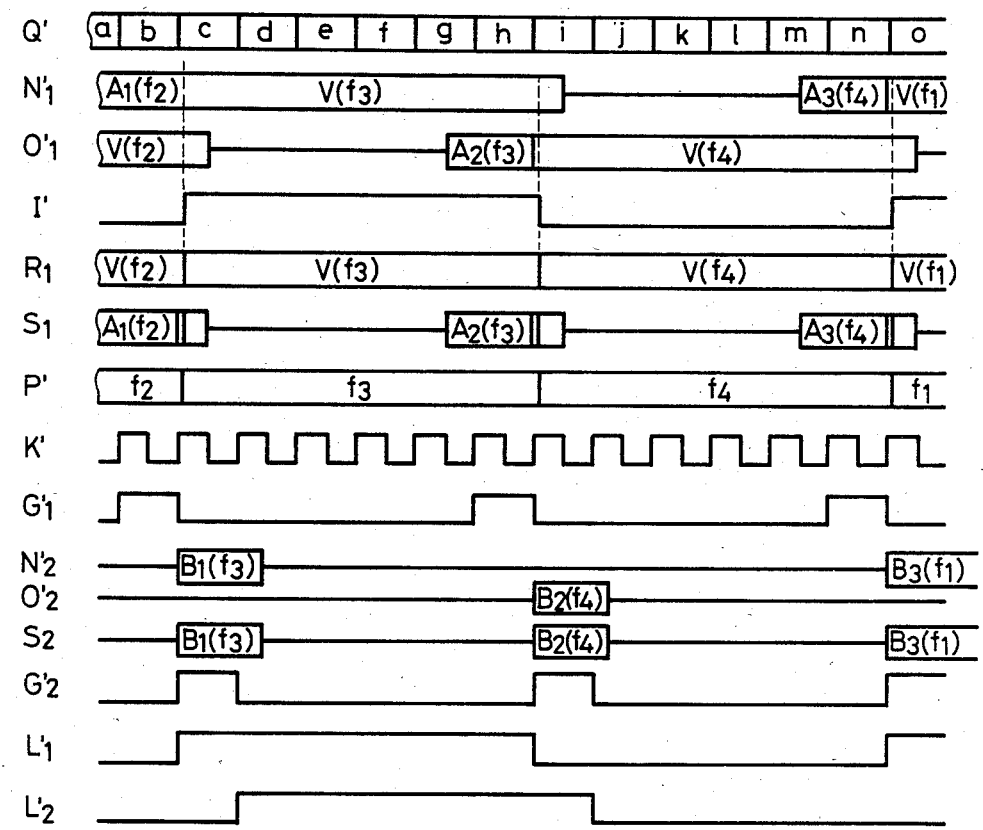
FIG. 13 is a schematic diagram of waveforms of signals appearing at various points in the apparatus shown in FIG. 12.

FIG. 12 shows a block diagram of an embodiment of a reproducing apparatus of the present invention. In FIG. 12 the numeral 49 denotes a reproducing amplifying circuit, the numeral 50 denotes a video signal reproducing processor, the numeral 51 designates an output terminal for the reproduced video signal, and the numeral 52 denotes an audio signal reproducing processor. The audio signal reproducing processor 52 receives a reproduced PCM signal Si and the timing pulses I', Li' and produces 2-channel audio signals to output terminals 53 and 54.

The numeral 55 denotes a linear amplifier, the numeral 56 denotes a switch, the numeral 57 denotes a bandpass filter, and the numerals 58 and 59 denote gate circuits. The numeral 60 denotes a converter which produces the product of the output signals of the gate circuits 58 and 59. The numerals 61, 62 and 63 respectively denote a gate circuit, a bandpass filter having a central frequency $f_h$ and a high Q-factor, and a bandpass filter having a central frequency 3fh and a high Q-factor. The numerals 64 and 65 denote amplitude detectors, the numeral 66 denotes a differential amplifier, the numeral 67 denotes an inverter and the numeral 68 denotes a switch. The numerals 28, 60, 62, 63, 64, 65, 66, 67 and 68 form a tracking-error detecting circuit for a tracking system having four pilot signals of different frequency. The numeral 69 denotes a sample hold circuit, and the numeral 70 denotes a delay circuit having a delay time longer than the delay circuit 35 shown in FIG. 5. The numerals 71, 72 and 73 respectively denote an inverter, a switch and a divider having 1/9954 dividing rate. The numeral 74 designates a divider having one sixth and one twelfth dividing rates, and which produces the track indicating pulses Li' and the gate pulses Gi'. The numerals 75 and 76 respectively denote a data selector and a seitch.

Referring to the apparatus shown in FIG. 12, there are three operating modes as described below:

(1) to simultaneously reproduce the video signal recorded on the information tracks B–G and the compressed audio PCM signal recorded on the information track A;

(2) to reproduce the compressed audio PCM signal recorded on one of the information tracks B–G;

(3) to reproduce the compressed audio PCM signal recorded on the information track A.

FIG. 17 shows the operating position of the switches 48, 72, 76 and 56 for each of the above-listed operating modes. In the first operating mode, the reproduced signals from the heads 23a and 23b are the signals $N_1'$, $O_1'$ shown in FIG. 13. The video signal $R_1$ and the compressed audio PCM signal $S_1$ are produced from the reproducing amplifying circuit 49. The pilot signal P' contained in the video signal $R_1$ is pulled out by the BPF 57 and is supplied to the tracking servo system. In this case, during all periods when the level of the gate pulse Gi' of the data selector 75 is high, the gates 58, 59 and 61, and the sample hold circuit 69 are in the ON-state. It is sufficient that one of the gates 58, 59 and 61, and the sample hold circuit 69 is inserted into the signal path. However, it is desirable that one of the gates 58, 59 and 61 may be used together with the sample hold circuit 69. In FIG. 17 the description N/A means that either the terminal N or the terminal A is selected.

In the second operating mode, for example, reproducing the compressed audio PCM signal from the information track B, the reproducing signals are the signals $N_2'$, $O_2'$. The output signal from the reproducing amplifying circuit 49 is the compressed audio PCM signal $S_2$. In order to detect a tracking error from the pilot signal, in the compressed audio PCM signal $S_2$, the gate pulse $G_2'$ is applied to the gates 58, 59 and 61, and the sample hold circuit 69.

In the third operating mode, the apparatus reproduces the pilot signals $f_2$ and $f_4$ recorded by the head 23a, and the pilot signals $f_1$ and $f_3$ recorded by the lead 23b. So the switch 76 selects the terminal A.

Figure 14:
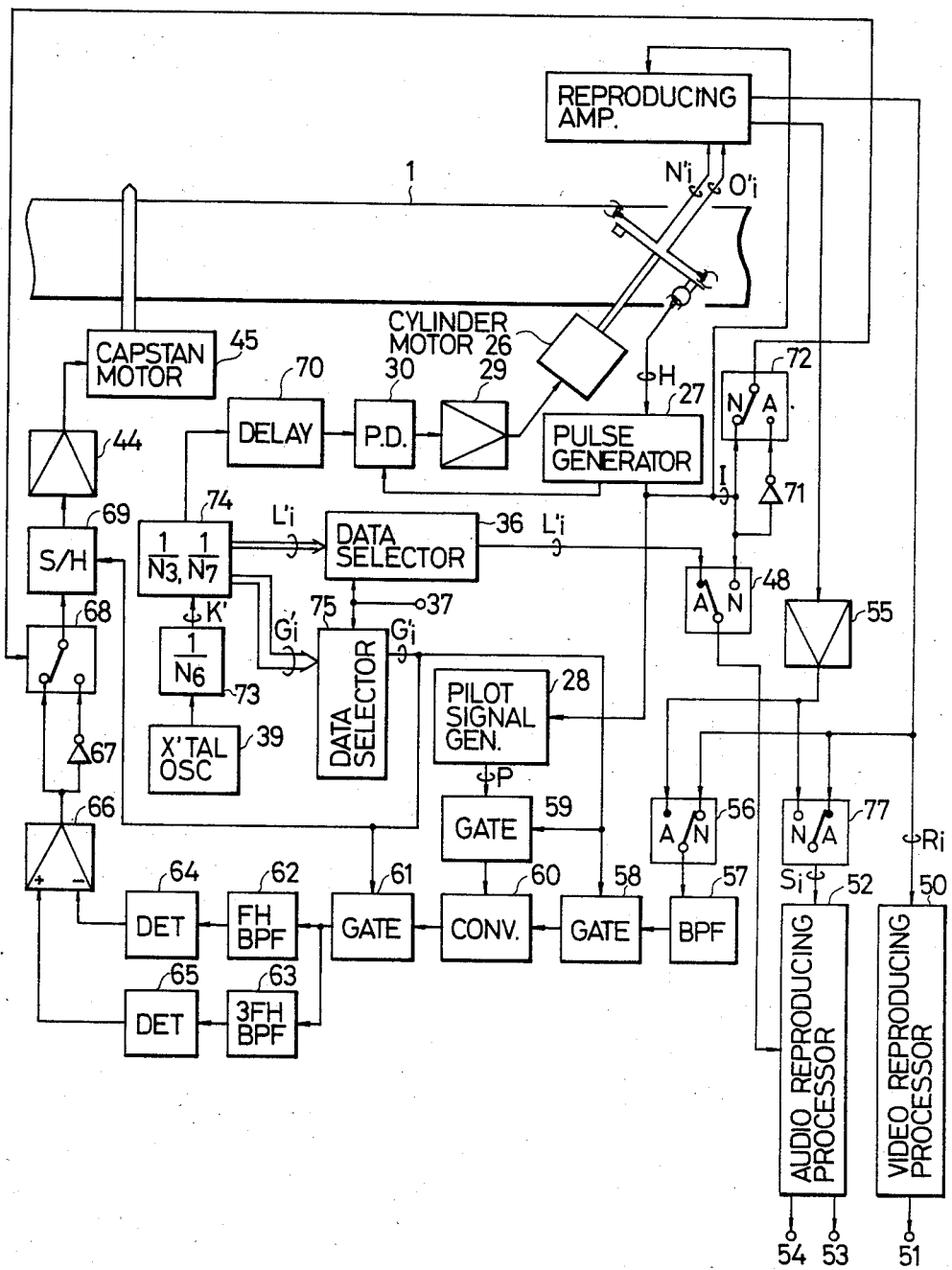
FIGS. 14, 15 and 16, respectively, are block diagrams of other embodiments of the magnetic reproducing apparatus of the present invention.

FIG. 14 shows a block diagram of the second embodiment of the reproducing apparatus of the present invention. The main difference from the apparatus shown in FIG. 12 is that a switch denoted by the numeral 77 is provided instead of the switch 76. FIG. 18 shows the motion of the switches 48, 72, 77 and 56.

Figure 15:
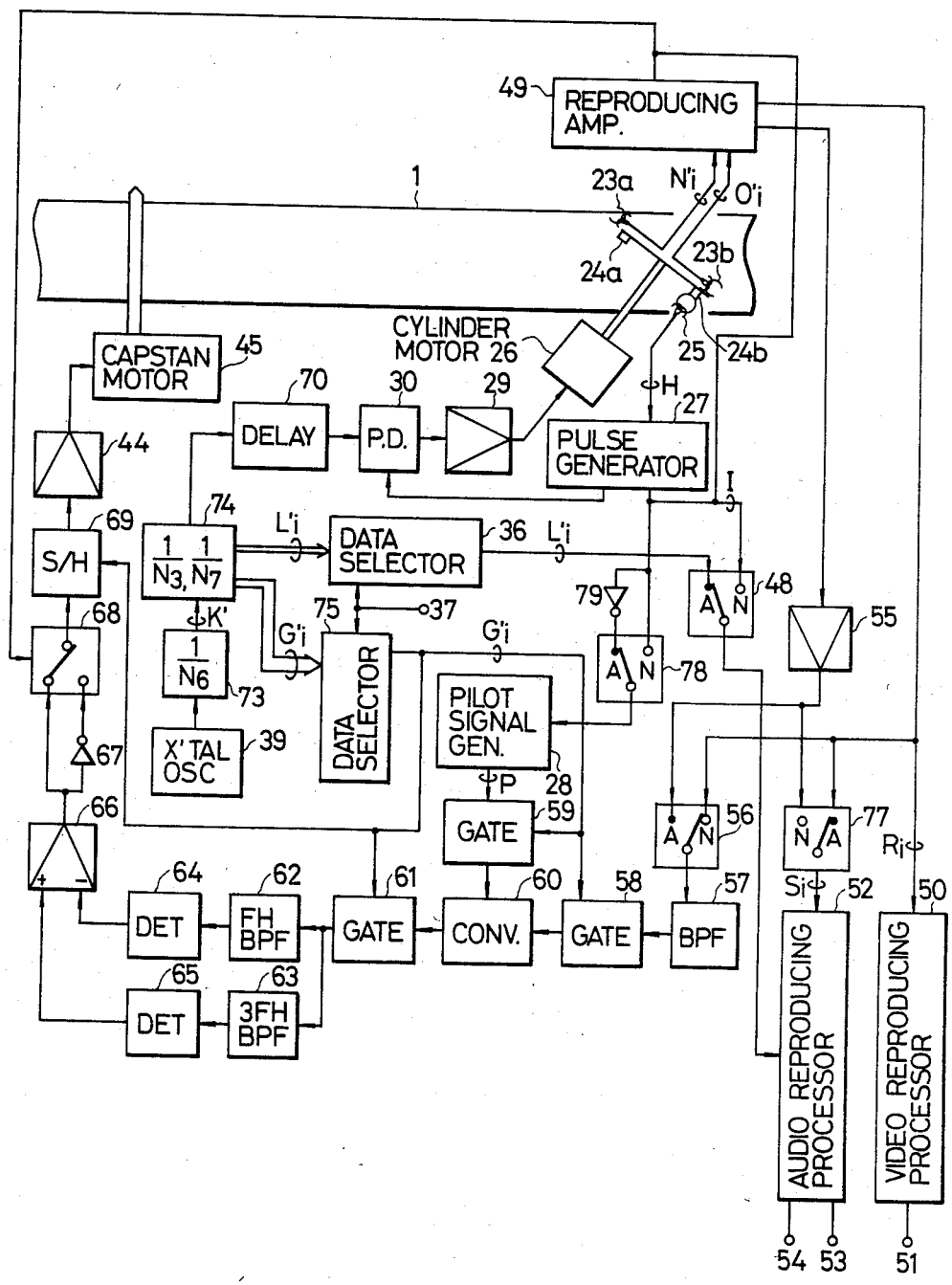

FIG. 15 shows a block diagram of the third embodiment of the reproducing apparatus of the present invention. The main difference from the apparatus shown in FIG. 12 is that an inverter denoted by the numeral 79 and a switch denoted by the numeral 78 are provided instead of the switch 72. FIG. 19 shows the motion of the switches 48, 78, 77 and 56.

Figure 16:
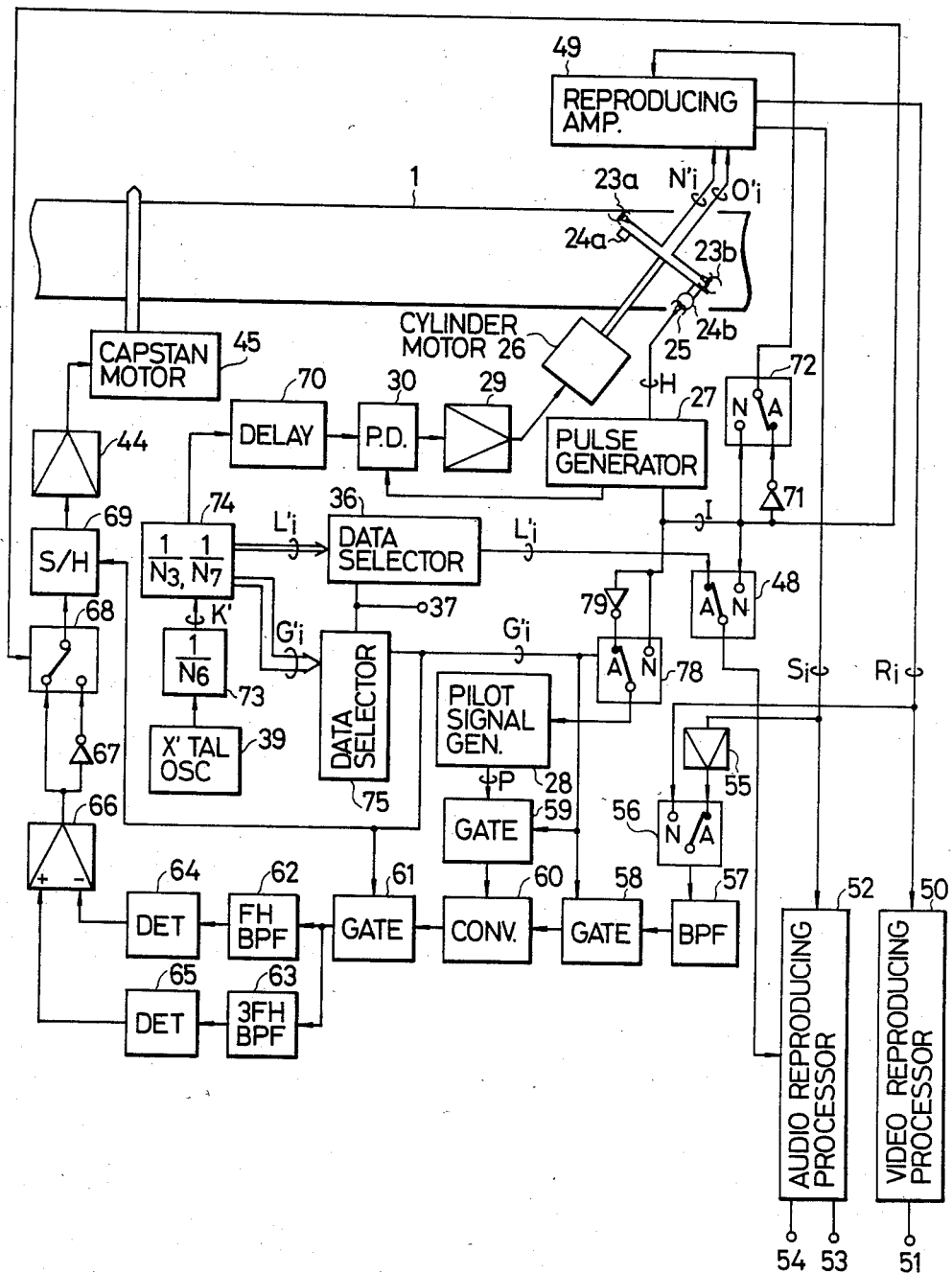

FIG. 16 shows a block diagram of the fourth embodiment of the reproducing apparatus of the present invention. The main difference from the apparatus shown in FIG. 12 is that the inverter 79 and the switch 78 are provided instead of the switch 76. FIG. 20 shows the motion of the switches 48, 72, 78 and 56.

Figure 21:
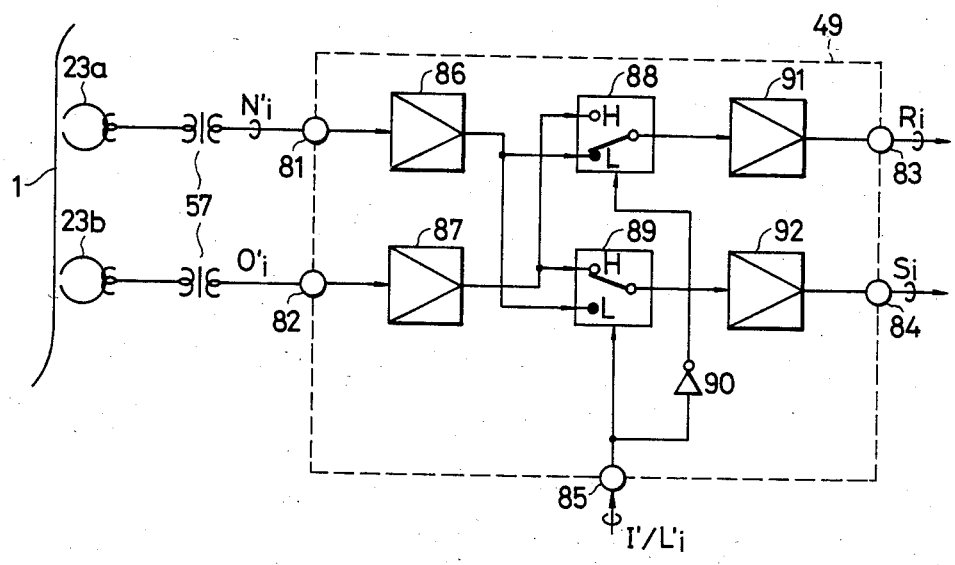
FIG. 21 is a block diagram of an embodiment of a reproducing amplifier circuit shown in FIG. 12.

FIG. 21 shows a block diagram of an embodiment of the reproducing amplifying circuit 49 shown in FIG. 12. The numerals 81 and 82 denote input terminals, the numeral 83 denotes an output terminal for the compressed audio PCM signal recorded on the information tracks B–G and the video signal, the numeral 84 denotes an output terminal for the compressed audio PCM signal, the numeral 85 denotes an input terminal for the pulses I' and Li', the numerals 86 and 87 denote head amplifiers, the numerals 88 and 89 denote switches, the numeral 90 denotes an inverter, and the numerals 91 and 92 denote buffer amplifiers. In general, the gain of the buffer amplifier 91 is about 10 dB larger than that of the buffer amplifier 92. Any leakage of the compressed audio PCM signal to the video signal becomes a visual interference, but leakage of the video signal to the compressed audio PCM signal produces no problem if the level of the video signal is smaller than a predetermined threshold level. Further, it is desirable to produce as large a chrominance signal or pilot signal as possible. Therefore, the linear amplifier 55, which is provided in the apparatus shown in FIGS. 12, 14, 15 and 16 to amplify the pilot signal obtained from the signal at the output terminal 34.

Figure 22:
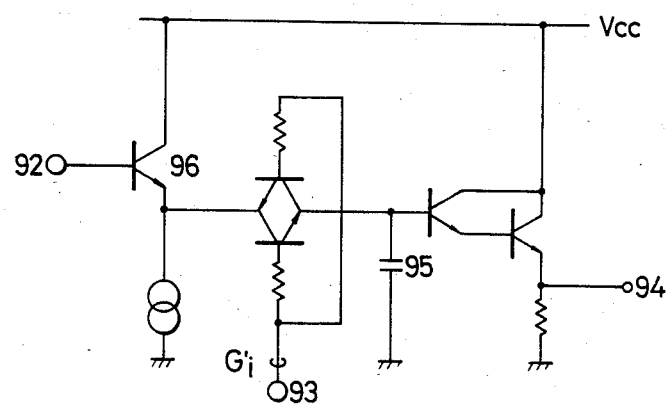
FIG. 22 is a schematic circuit diagram of an embodiment of a sample and hold circuit shown in FIG. 12.

FIG. 22 shows a diagram of an embodiment of the sample and hold circuit 69 used in the apparatus of the present invention. In FIG. 22, the numerals 92, 93, 94 and 95 respectively denote an input terminal, a control terminal receiving the gate pulse Gi', an output terminal and a condenser. During the time when the level of the gate pulse Gi' at the control terminal 93 is high, the signal supplied to the input terminal 92 is straight-forwardly transferred to the output terminal 94. On the other hand, when the level thereof is low, the voltage indicative of the tracking error is held at the condenser 95.

All the gates 58, 59 and 61 shows in FIGS. 12, 14, 15 and 16 transfer the input signal, when the gate pulse Gi' is high, and block the input signal, when the gate pulse Gi' is low. There are many positions which the gates 58, 59 and 61 are inserted. However, it is desirable to insert the gates into the input sides of the BPFs 62 and 63 in consideration of the DC offset.

Figure 23:
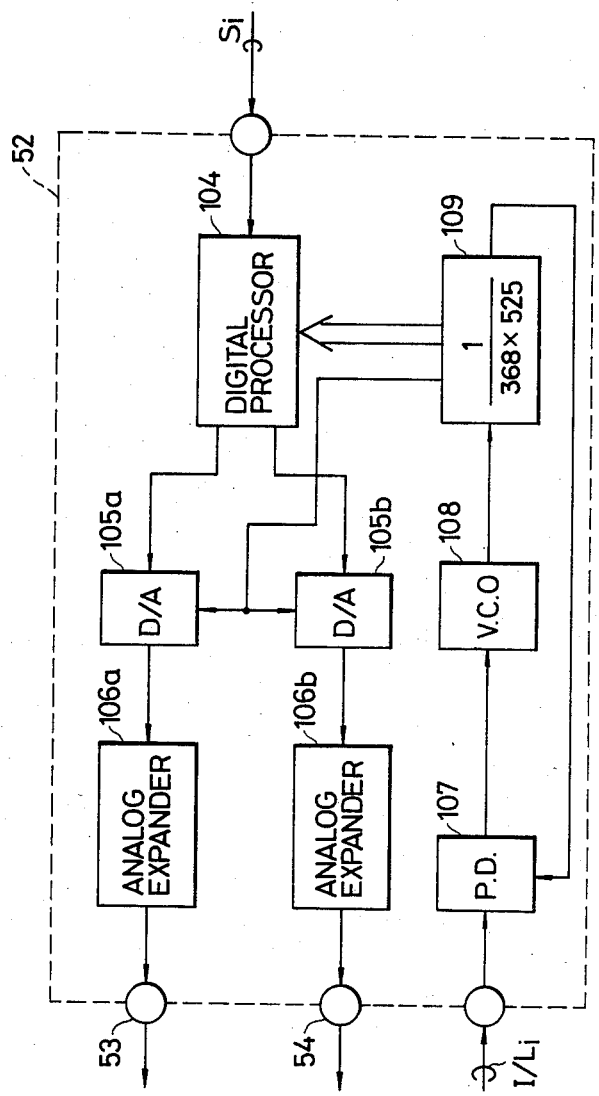
FIG. 23 is a block diagram of an embodiment of an audio signal reproducing processor shown in FIG. 12.

FIG. 23 shows a block diagram of an embodiment of the audio reproducing processor 52 shown in FIG. 12. In FIG. 23, the numeral 104 denotes a digital signal processor constructed by a time-expand circuit, an error compensating circuit, etc., the numerals 105a and 105b denote a digital-analog converter, and the numerals 106a and 106b denote analog expand circuits which have a reverse characteristic to the analog compressors 97a and 97b. The numerals 107, 108 and 109 respectively denote a phase detector, a voltage control oscillator and a divider. The detail explanation of the analog expanders 106a and 106b and the D/A converters 105a and 105b, is omitted too, since they are well known to persons having ordinary skill in the art. The digital signal processor 104 performs a function which is the inverse of that performed by the digital signal processor 21, described in detail in conjunction with FIG. 7A.

Figure 24:
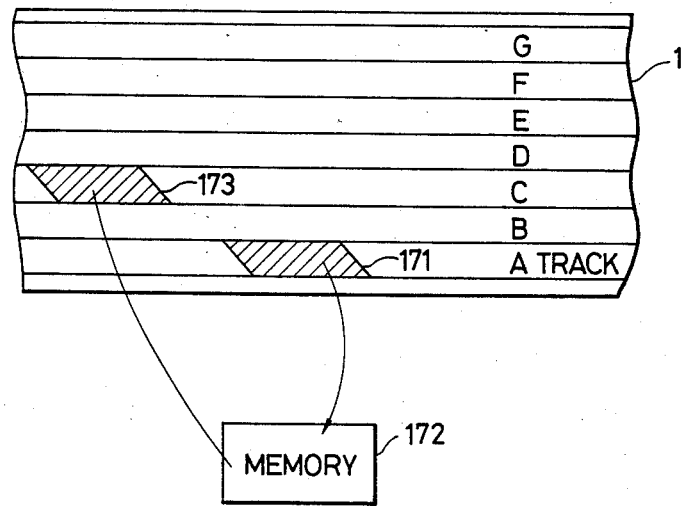
FIGS. 24, 25A and 25B, respectively, are schematic diagrams for explaining an editing system of the present invention.

Next, a new editing system of this invention is explained. FIG. 24 shows a schematic diagram for explaining the new editing system. Referring to FIG. 24 the numeral 171 denotes a part of the information track A in which a digital signal is recorded. The numeral 173 denotes a part of the information track C in which another digital signal is recorded. The editing system transfers the digital signal recorded on the part 171 to the part 173 via a memory denoted by the numeral 172.

In general, a unit of the digital signal is called a word. As each of the words is successively recorded on the tape, a synchronous signal is inserted every plurality of words in order to know the heading of each word. The group of the words with the synchronous signal is called a block. Also, a block code for distinguishing the block and other data are recorded on the part in which the synchronous signal is recorded, and which is called a pre-block. Further, a post-block is provided as well.

Figure 25A:
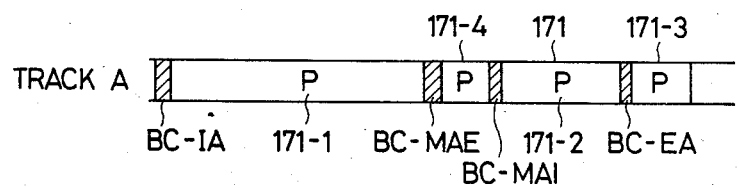
Figure 25B:
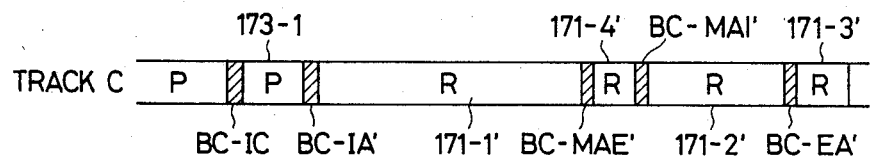

The editing system using the block codes is explained by using FIGS. 25A and 25B, which show schematic diagrams of the information track. Now it is assumed that the quantity of the digital signal recorded on the part 171 shown in FIG. 25A is larger than the capacity of the memory 173. An initial block code of the part 171 recorded on the information track is BC-1A, and a last block code thereof is BC-EA. A small part denoted by the numeral 171-3 is a data block having the block code BC-EA. Also, the numerals 171-1, 171-2 and 171-4 denote data blocks. In the editing operation, the block codes BC-IA and BC-EA are assigned. Thus, the quanity of data of the part 171 is compared with the capacity of the memory 172. If the former is larger than the latter, the part 171 is divided into the small parts 171-1 and 171-2. The block code BC-MAE is the last block code of the small part 171-1 and the block code BC-MAI is the first block code of the small part 171-2. That is, the part 171 is divided into small parts, each of which is capable of being stored in the memory 173, and transferred to the information track C.

In FIGS. 25A and 25B, P and R respectively denote the reproducing data and the recording data. The data code BC-IC is for the data recorded on the information track C and is indicated in order to record the part 171 on the next part of the information track C. Accordingly, the block code BC-IC, the small part 171-1, the block code BC-MAE and the small part 171-4 are respectively recorded in the positions of the block code BC-IA', the part 171-1', the block code BC-MAE' and the part 171-4' shown in FIG. 25B. Similarly, the block code BC-MAIE, the part 171-2, the block BC-EA and the part 171-3 are transferred. In this case, for detecting the necessary block codes, the tape is properly supplied and taken up. This tape carrying operation can be automatically performed by detecting the block codes as well. Further, block codes are generally a series of the sequential numbers. Therefore, each of the block codes recorded after the block code BC-IC on the information track C can be exchanged for the sequential numbers of the block code BC-IC.

Figure 26:
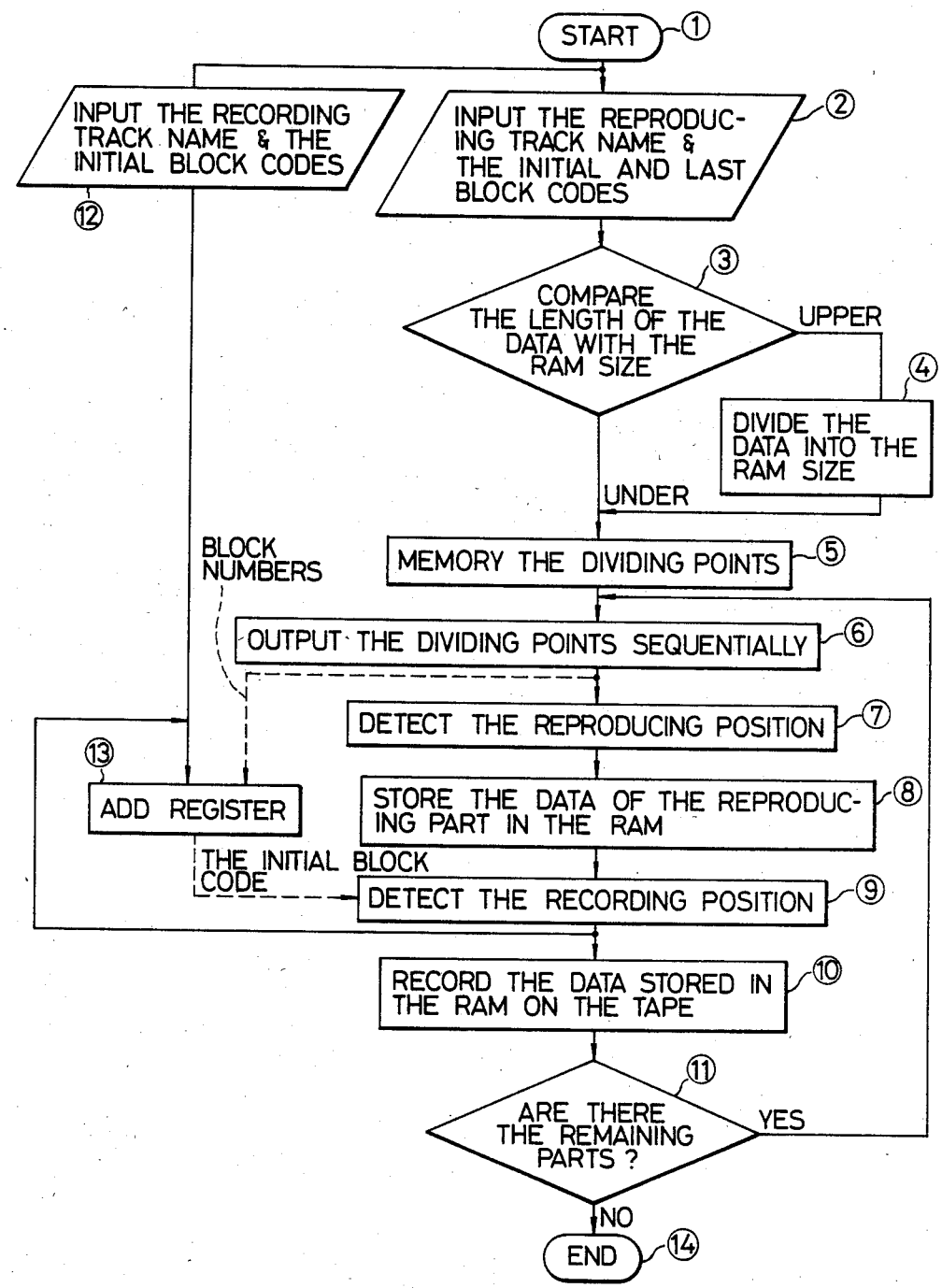
FIG. 26 is a flow chart of an embodiment of the editing system of the present invention.

FIG. 26 show a flow chart of an embodiment of the editing system of this invention explained by FIGS. 24, 25A and 25B, and FIG. 27 shows a block diagram thereof. Referring to FIG. 26, at the starting (①), the name of the information track, the initial block code and the last block code of the reproduced part are input (②). Before the data of the reproduced part is stored in a RAM, it is executed to check whether the data overflows the capacity of the RAM (③). If the data overflows it, the data is divided into smaller sizes that the capacity. (④). Dividing points obtained by the upper step are stored until the edigint is over (⑤). Next, the initial block code and the last block code of the first small part of the divided data is read out and temporarily stored (⑥). Then, the recording/reproducing apparatus is set to the reproducing state, and searches the initial block code (⑦). After the initial block code is detected, the data is stored in the RAM until the last block code (⑧).

Further, it is necessary to record the data stored in the RAM on the recording information track. So, firstly, the name of the recording information track and the initial block code are input ( ⑫ ). The initial block code is stored in the add register ( ⑬ ). Next, by reproducing the recording information track, the initial block code is detected (⑨). If the initial block code is detected, from the next block the apparatus is set to the recording state and the data of the RAM is recorded. By the steps aforementioned, editing the data of the first part of the reproducing information track is over.

Next, the initial block code of the second part of the reproducing information track is read out (⑥). Further, the number of blocks which have been recorded at the former steps is added to the content of the add register. The resultant of this addition becomes the initial block code of the next part of the recording information track. After that, the above float is repeated until the remaining part becomes zero.

Figure 27:
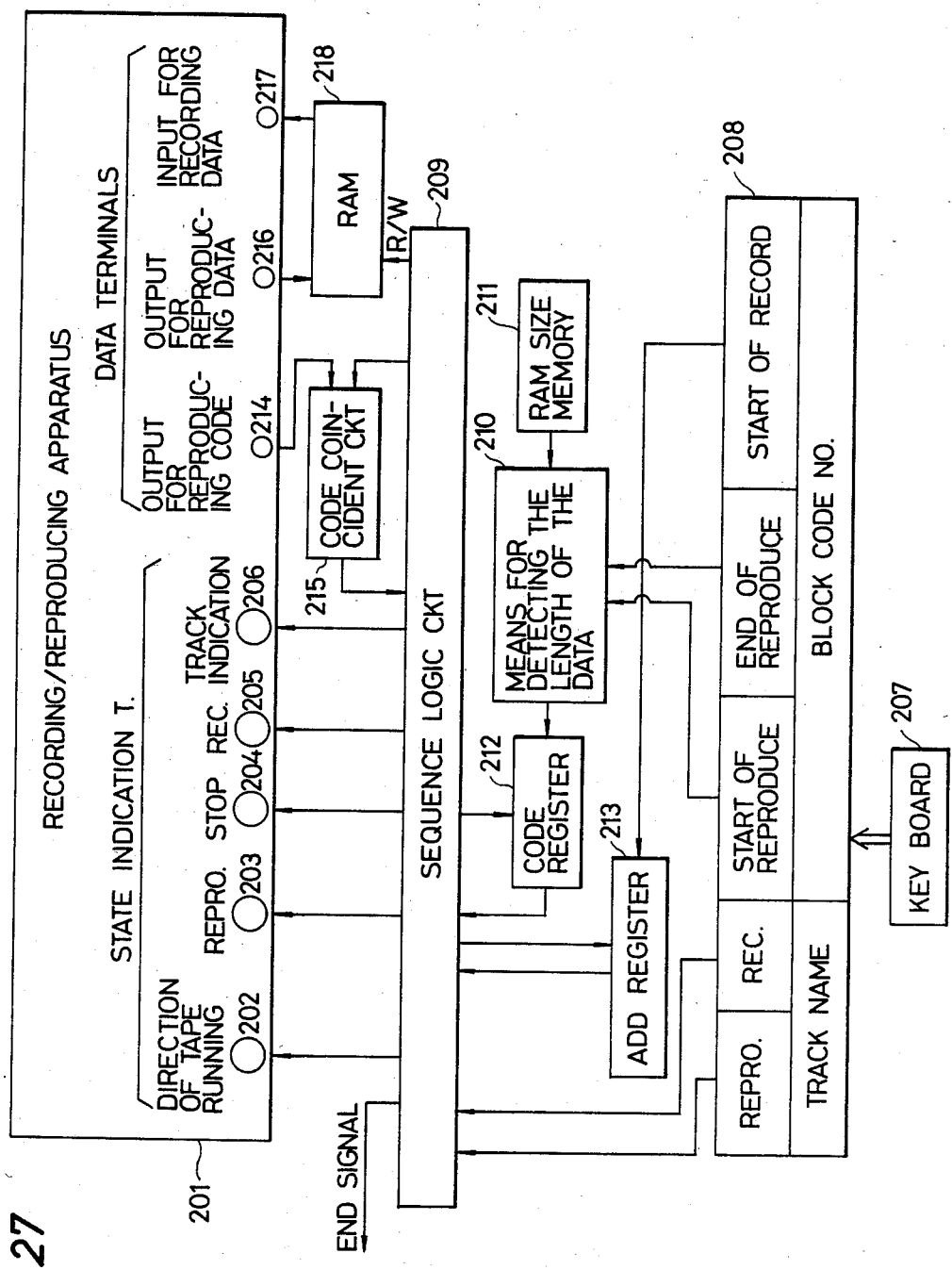
FIG. 27 is a block diagram of the embodiment for executing the flow chart shown in FIG. 26.

Referring to FIG. 27, the numeral 201 denotes the recording/reproducing apparatus of this invention. The numerals 202–206 designate terminals for the state indication. The numeral 207 denote a key board for editing, by which the names of the reproducing information track and the recording information track are input. The names are stored in a register denoted by the numeral 209, and supplied to a sequence logic circuit denoted by the numeral 209. Similarly, the initial block code and the last block code are supplied and stored. Next, in means for deciding the length of the data denoted by the numeral 201, the length of the data is compared with the number of the blocks corresponding to the capacity of the RAM 218, which is stored in the RAM size memory 211. Further, if the length of the data is longer than the capacity of the RAM 218, the means 210 divides the data into a proper length smaller than the capacity of the RAM 218, and generates an intermediate block code corresponding to dividing points, which is stored in a code register denoted by the numeral 212. The initial block code of the recording information track is transferred to an add register denoted by the numeral 213 and supplied to the sequence logic circuit 209.

The block codes of the reproducing information track are produced from a terminal denoted by the numeral 214 of the apparatus 201, supplied to a code coincident circuit denoted by the numeral 215, and compared with the output of the code register 212 or the add register 213 for detecting the coincidence, which is supplied to the code coincident circuit 215 via the sequence logic circuit 209. The numerals 216 and 217 respectively denote the output terminal of the reproducing data and the input terminal of the recording data, which are connected to the RAM 218. For the sequence logic circuit 209, a PLA (program logic circuit), a microcomputer, etc., are used.

As was mentioned above, the present invention can provide a recording/reproducing apparatus which is able to record/reproduce a large amount of information in/from the tape. Further, this invention has useful functions. For example, it is possible for this invention to record the same information on two information tracks in order to have high reliability. If the error rate of the data by recording the information on one information track is about $10^{-3}$, the error rate of the data by recording the information on two information tracks becomes about $10^{-6}$.

Similarly, it is possible for this invention to have high faithfulness in the reproduction of the information. As the lower eight bits of the audio PCM signal are recorded on one information track, the higher eight bits thereof can be recorded on another information track.

It is possible for the apparatus of the present invention to record/reproduce auto reversely. For example, in FIG. 3, after the information track A is recorded, the information track C is recorded under the condition that the direction of tape running is reverse. That is, the information tracks A–G are sequentially recorded without rewinding the tape.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of oridinary skill in the art.

What is claimed is:

1. A method for recording information on a tape by rotating heads in a helical scan type magnetic recording apparatus, comprising the steps of:
   (a) generating a plurality of N track indicating pulses which are phase-locked to the rotation of the rotating heads, each of which corresponds in time to the tracking time by said rotating heads of a respective one of a plurality of N information tracks disposed in parallel to the direction of the tape running;
   (b) selecting one of said N track indicating pulses; and
   (c) supplying an information signal to the heads in time with the selected track indicating pulse.

2. A recording method according to claim 1, wherein said information signal is a time-compressed audio PCM signal and determining the timing of time-compressing the audio PCM signal by said selected track indicating pulse.

3. A method according to claim 1, wherein said information signal is a time-compressed audio PCM signal, and further comprising the steps of recording the time-compressed PCM audio signal on the one of the N information tracks disposed in parallel to the direction of tape running as determined by the selected track indication pulse, the N information tracks being audio information tracks disposed in parallel over at least a central portion of the tape in a direction transverse to the tape running direction.

4. A method according to claim 1, wherein said N information tracks are audio signal tracks, further comprising the steps of:
   converting a first audio signal to a first time-compressed audio PCM signal in response to said selected track indicating pulse;
   supplying said first time-compressed audio PCM signal to the heads in time with said selected track indicating pulse for enabling recording of said first time-compressed audio PCM signal;
   selecting another one of said N track indicating pulses;
   converting a second audio signal to a second time-compressed audio PCM signal in response to said another selected one of said track indicating pulses; and
   supplying said second time-compressed audio PCM signal to the heads in time with said another one of said selected track indicating pulses for enabling recording of said second time-compressed audio PCM signal.

5. A method according to claim 4, further comprising the steps of recording said first time-compressed audio PCM signal on a respective one of said information tracks corresponding to said selected track indicating pulse, and recording said second time-compressed audio PCM signal on another respective one of said information tracks corresponding to said another one of said selected track indicating pulses.

6. A method according to claim 6, wherein said N information tracks are disposed over at least a central portion of the tape in a direction transverse to the tape running direction.

7. A method for reproducing a time-compressed audio PCM signal from a tape by means of rotating heads in a helical scan type magnetic reproducing apparatus, comprising the steps of:
   (a) generating a plurality of N track indicating pulses corresponding respectively in time to the tracking time by said rotating heads of a plurality of N respective information tracks disposed in parallel to the direction of the tape running which pulses are phase-locked to the rotation of the rotating heads;
   (b) selecting one of said N track indicating pulses corresponding to one of said N information tracks having the time-compressed audio PCM signal recorded thereon; and
   (c) reading from said tape the time-compressed audio PCM signal at the time indicated by said selected track indicating pulse.

8. A method according to claim 7, further comprising expanding the time-compressed audio PCM signal read from said tape.

9. A method according to claim 7, wherein said N information tracks disposed in parallel to the direction of the tape running respectively store different time-compressed audio PCM signals thereon, said N information tracks being disposed at least in a central portion of the tape in a direction transverse to the tape running direction.

10. In a helical scan type magnetic tape recording apparatus including a capstan for moving the tape, rotating heads for recording information on the tape, a cylinder for rotating the heads, and a cylinder motor for rotating the cylinder, the improvement comprising:
(a) means for generating a plurality of N track indicating pulses, each of which respectively corresponds in time to the tracking time by said rotating heads of a plurality of N information tracks disposed in parallel to the direction of the tape running;
(b) means for phase-locking said N track indicating pulses to the rotation of the heads;
(c) means for seelcting one of said N track indicating pulses; and
(d) means coupled to said selecting means for supplying an information signal to the heads in time with the selected track indicating pulse.

11. An apparatus according to claim 10, further comprising:
(e) means for generating a pilot signal which sequentially and repeatedly varies in frequency between a number of predetermined frequencies in response to the rotation of the heads; and
(f) means for mixing said pilot signal with said information signal.

12. An apparatus according to claim 11, wherein said pilot signal has four predetermined frequencies.

13. An apparatus according to claim 10, further comprising:
(g) means connected to said selecting means for converting an audio signal into a time-compressed audio PCM signal in response to the timing of said selected track indicating pulse and means for applying said time-compressed audio PCM signal to said supplying means as said information signal.

14. An apparatus according to claim 11, wherein the heads serve for recording the information signal supplied thereto onto one of said N information tracks corresponding respectively to the selected track indicating pulse.

15. An apparatus according to claim 11, wherein the information signal is a time-compressed audio PCM signal and said N information tracks are provided for storing said time-compressed audio PCM signal, said N information tracks being disposed over at least a central portion of the tape in a direction transverse to the tape running direction.

16. An apparatus according to claim 11, wherein two rotating heads are provided, said two rotating heads simultaneously tracing at least one of said N information tracks.

17. An apparatus according to claim 16, wherein said two rotating heads record said pilot signal having the same frequency during the simultaneous tracking of said at least one of said N information tracks.

18. An apparatus according to claim 11, wherein said supplying means includes means connected to said selecting means for converting an audio signal into a time-compressed audio PCM signal in response to the timing of said selected track indicating pulse and for providing said time-compressed audio PCM signal to the heads as said information signal.

19. In a helical scan magnetic tape reproducing apparatus including a capstan for moving the tape, rotating heads for reproducing information from the tape, a cylinder for rotating the heads, and a cylinder motor for rotating the cylinder, the improvement comprising:
(a) means for generating a plurality of N track indicating pulses, each of which respectively corresponds in time to the tracking time by said rotating heads of a plurality of N information tracks disposed in parallel to the direction of the tape running;
(b) means for phase-locking said N track indicating pulses to the rotation of the heads;
(c) means for selecting one of said N track indicating pulses; and
(d) means coupled to said selecting means for extracting a corresponding information signal from information signals reproduced by the heads in time with said selected track indicating pulse.

20. In a helical scan type magnetic tape recording/reproducing apparatus including a capstan for moving the tape, control means for controlling the capstan, a plurality of heads for recording/reproducing information on respective slant tracks of the tape scanned by said heads, a cylinder for carrying the heads, means including a cylinder motor for rotating the cylinder to effect rotation of the heads, and pulse generator means for generating a pulse in time with the rotation of the heads, the improvement comprising:
(a) means for generating a plurality of N track indicating pulses, each of which respectively corresponds in time to the tracking time by said rotating heads of a plurality of N information tracks disposed in parallel to the direction of the tape running;
(b) means for selecting one of said N track indicating pulses;
(c) means for receiving an audio signal;
(d) means connected to said audio signal receiving means for converting said audio signal to a time-compressed audio PCM signal;
(e) means for receiving a video signal;
(f) means connected to said video signal receiving means for separating from said video signal a vertical synchronizing signal;
(g) first switching means for selecting said vertical synchronizing signal or the selected one of said track indicating pulses;
(h) means for phase-locking the output of said first switching means to the output pulse of said pulse generator means;
(i) second switching means for selecting the output pulse of said pulse generator means or said selected track indicating pulse and for supplying the selected pulse to said converting means for controlling the timing of the compressing of said audio signal; and
(j) recording amplifying means connected to said converting means and said video signal receiving means for amplifying the output signals thereof and for supplying said amplified signals to the heads.

21. An apparatus according to claim 20, further comprising:
(k) means connected to said pulse generator means for generating a pilot signal which sequentially and repeatedly varies its frequencies between a number of predetermined frequencies in response to the output pulse of said pulse generator means and for supplying said pilot signal to said recording amplifying means.

22. An apparatus according to claim 21, further comprising:
- (l) reproducing amplifying means for amplifying a reproduced signal reproduced by the heads; and
- (m) means connected to said reproducing amplifying means for converting a reproduced time-compressed audio PCM signal contained in said reproduced signal into a reproduced audio signal in response to an output pulse of said second switching means.

23. An apparatus according to claim 22, further comprising:
- (n) means connected to said reproducing amplifying means for extracting a reproduced pilot signal contained in said reproduced signal, and means for generating a tracking error signal in response to said reproduced pilot signal and for supplying said tracking error signal to said control means for controlling the capstan.

24. An apparatus according to claim 23, further comprising:
- (o) means for generating N gate pulses which are phase-locked to the rotation of the heads; and
- (p) means for selecting one of said N gate pulses, which corresponds to said selected indicating pulse and for supplying said selected gate pulse to said extracting means for gating a part of said reproduced pilot signal.

25. An apparatus according to claim 24, further comprising:
- (q) oscillating means for generating a timing signal, wherein said means for generating N track indicating pulses and said means for generating N gating pulses include a divider connected to said oscillating means for dividing the output thereof.

26. In a helical scan magnetic tape reproducing apparatus including a capstan for moving the tape, rotating heads for reproducing information from the tape, a cylinder for rotating the heads, and a cylinder motor for rotating the cylinder, the improvement comprising:
- means for generating a plurality of N track indicating pulses, each of which respectively corresponds in time to the tracking time by said rotating heads of a plurality of N information tracks disposed in parallel to the direction of the tape running;
- means for phase-locking said N track indicating pulses to the rotation of the heads;
- means for selecting one of said N track indicating pulses;
- means coupled to said selecting means for extracting a corresponding information signal from information signals reproduced by the heads in time with said selected track indicating pulse;
- pilot signal selecting means coupled to said extracting means for selecting a pilot signal frequency-multiplexed to said corresponding information signals;
- detecting means coupled to said pilot signal selecting means for detecting a tracking-error signal in accordance with said pilot signal; and
- feed back means coupled to said detecting means for feeding back said tracking-error signal to said capstan.

27. An apparatus according to claim 26, further comprising sample-hold means disposed between said detecting means and said feedback means for sampling and holding said tracking-error signal during a period other than a period determined by said selected track indicating pulse.

28. An apparatus according to claim 26, further comprising transmitting means disposed between said pilot signal selecting means and said detecting means for transmitting said pilot signal during a period determined by said selected track indicating pulse.

29. A method for magnetically recording/reproducing an information signal with a plurality of rotating heads for recording/reproducing information on from an oblique track of a magnetic tape wherein a cylinder carries the plurality of rotating heads and a wrapping angle of the magnetic tape around the cylinder is larger than 180°, comprising the steps of:
- selecting one of a first mode for recording/reproducing of an information signal in the form of a television signal having a video signal and an audio signal and a second mode for recording/reproducing only an audio signal;
- upon selecting the first mode, converting the video signal to a frequency modulated video signal and the audio signal to a time-compressed audio PCM signal; and
- recording the frequency-modulated video signal on a central part of the oblique track of the magnetic tape and the time-compressed audio PCM signal on one of the ends of the oblique track which ends are proximate to an edge of the tape; and
- upon selecting the second mode, converting the audio signal to a time-compressed audio PCM signal; and
- recording the time-compressed audio PCM signal on one of a plurality of information segments of the oblique track disposed at least at a central part of the oblique track.

30. A method according to claim 29, further comprising in the second mode, generating a plurality of segment indicating pulses, each of which respectively corresponds in time to the tracking time by the rotating heads of an information segment of the oblique track, selecting one of the segment indicating pulses and recording the time-compressed audio PCM signal on the corresponding one of the plurality of information segments of the oblique track as determined by the selected one of the segment indicating pulses.

31. A method according to claim 29, further comprising in the second mode, generating a pilot signal and mixing the pilot signal to the time-compressed audio PCM signal for recording therewith.

32. A method according to claim 29, further comprising in the first mode, generating a pilot signal and mixing the pilot signal with the frequency modulated video signal and the time-compressed audio PCM signal for recording therewith.

33. A method according to claim 30, further comprising in the second mode reproducing the time-compressed audio PCM signal on the corresponding one of the plurality of information segments of the oblique track other than the segment proximate to one edge of the tape.

34. A helical scan type magnetic tape recording apparatus including a capstan for moving the tape, a plurality of rotating heads for recording information on the tape, a cylinder for rotating the heads, and a cylinder motor for rotating the cylinder, the improvement comprising:
- means for generating a plurality of N track indicating pulses which are phase-locked to the rotation of the rotating heads, each of which corresponds in time to the tracking time by said rotating heads of a respective one of a plurality of N information tracks disposed in parallel to the direction of the tape running;

a plurality of N input terminals for a plurality of audio signals, a plurality of N audio signal processor means coupled to respective ones of said input terminals for converting a respective one of said audio signals to a time-compressed audio PCM signal in response to a respective one of said track indicating pulses, mixing means connected to said N audio signal processor means for mixing all of said time-compressed audio PCM signals and producing at least one time-division multiplexed audio signal, and means for supplying said time-division multiplexed audio signal to said heads.

35. An apparatus according to claim 34, further comprising means for generating a pilot signal, said mixing means mixing said pilot signal with said time-compressed audio PCM signals.

* * * * *